(12) United States Patent
Peterson et al.

(10) Patent No.: US 8,760,413 B2
(45) Date of Patent: Jun. 24, 2014

(54) TACTILE SURFACE

(75) Inventors: Cody George Peterson, Coeur d'Alene, ID (US); Douglas M. Krumpelman, Hayden, ID (US); Andrew P. Huska, Post Falls, ID (US)

(73) Assignee: Synaptics Incorporated, San Jose, CA (US)

( * ) Notice: Subject to any disclaimer, the term of this patent is extended or adjusted under 35 U.S.C. 154(b) by 777 days.

(21) Appl. No.: 12/580,002

(22) Filed: Oct. 15, 2009

(65) Prior Publication Data

US 2010/0171715 A1 Jul. 8, 2010

Related U.S. Application Data

(60) Provisional application No. 61/143,203, filed on Jan. 8, 2009, provisional application No. 61/171,646, filed on Apr. 22, 2009.

(51) Int. Cl.
*G06F 3/041* (2006.01)

(52) U.S. Cl.
USPC .............. 345/173; 341/22; 341/23; 341/27; 341/33; 341/34; 345/161; 345/174; 715/701; 715/702; 200/600

(58) Field of Classification Search
USPC .......... 345/173, 174, 161; 341/22, 23, 27, 33, 341/34; 715/701, 702; 200/600
See application file for complete search history.

(56) References Cited

U.S. PATENT DOCUMENTS

| 3,886,341 A | 5/1975 | Forrest |
| 4,334,280 A | 6/1982 | Mcdonald |
| 4,403,123 A | 9/1983 | Shek |
| D278,239 S | 4/1985 | Felix et al. |
| D284,574 S | 7/1986 | Fischer |
| D292,801 S | 11/1987 | Davis, Jr. et al. |
| 4,786,766 A | 11/1988 | Kobayashi |

(Continued)

FOREIGN PATENT DOCUMENTS

| CN | 1659717 A | 8/2005 |
| DE | 19704253 | 8/1998 |

(Continued)

OTHER PUBLICATIONS

"Tactile Perception and Design", Retrieved from <http:///www.tireesias.org/reports/tpd2.htm> on Apr. 4, 2006, 10 pages.

(Continued)

*Primary Examiner* — Alexander S Beck
*Assistant Examiner* — Amen Bogale
(74) *Attorney, Agent, or Firm* — Ingrassia Fisher & Lorenz P.C.

(57) ABSTRACT

In one or more embodiments, a device includes a surface and an actuator mechanism operably associated with the surface. The actuator mechanism is configured to provide tactile feedback to a user responsive to an electrical signal. In at least some embodiments, the actuator mechanism comprises a pair of spaced-apart substrates each of which supports a conductive layer of material. A dielectric material and an adjacent air gap may be interposed between the substrates. Drive circuitry is operably connected to the spaced-apart substrates and is configured to drive the conductive layers of material with an electrical signal. This signal may be responsive to sensing a touch input on the surface or other appropriate event.

36 Claims, 16 Drawing Sheets

(56) References Cited

U.S. PATENT DOCUMENTS

| | | |
|---|---|---|
| 4,885,565 A | 12/1989 | Embach |
| D312,623 S | 12/1990 | Carter et al. |
| 5,121,091 A | 6/1992 | Fujiyama |
| 5,189,390 A | 2/1993 | Fagard |
| 5,212,473 A | 5/1993 | Louis |
| 5,239,152 A | 8/1993 | Caldwell et al. |
| 5,626,223 A | 5/1997 | Lee |
| 5,667,061 A | 9/1997 | Lee |
| 5,921,382 A | 7/1999 | Retter |
| 5,973,670 A | 10/1999 | Barber et al. |
| 5,977,867 A | 11/1999 | Blouin |
| 5,977,888 A | 11/1999 | Fujita et al. |
| 5,982,304 A | 11/1999 | Selker et al. |
| 6,039,258 A | 3/2000 | Durbin et al. |
| 6,067,081 A | 5/2000 | Hahlganss et al. |
| 6,118,435 A | 9/2000 | Fujita et al. |
| 6,218,966 B1 | 4/2001 | Goodwin et al. |
| 6,219,034 B1 | 4/2001 | Elbing et al. |
| 6,262,717 B1 | 7/2001 | Donohue et al. |
| 6,373,463 B1 | 4/2002 | Beeks |
| 6,392,515 B1 | 5/2002 | Van Zeeland et al. |
| 6,429,846 B2 | 8/2002 | Rosenberg et al. |
| 6,466,118 B1 | 10/2002 | Van Zeeland et al. |
| 6,542,058 B2 | 4/2003 | Van Zeeland |
| 6,677,843 B1 | 1/2004 | Monroe et al. |
| 6,693,626 B1 | 2/2004 | Rosenberg |
| 6,723,937 B2 | 4/2004 | Englemann et al. |
| 6,819,990 B2 | 11/2004 | Ichinose |
| 6,822,635 B2 | 11/2004 | Shahoian et al. |
| 6,861,603 B1 | 3/2005 | Wang |
| 6,911,901 B2 | 6/2005 | Bown |
| 6,937,124 B1 | 8/2005 | Nakamura et al. |
| 6,982,617 B2 | 1/2006 | Brilon et al. |
| D527,004 S | 8/2006 | Yen |
| 7,106,305 B2 | 9/2006 | Rosenberg |
| 7,113,177 B2 | 9/2006 | Franzen |
| 7,119,798 B2 | 10/2006 | Yoshikawa et al. |
| 7,148,789 B2 | 12/2006 | Sadler et al. |
| 7,166,795 B2 | 1/2007 | Lengeling |
| 7,182,691 B1 | 2/2007 | Schena |
| 7,196,688 B2 | 3/2007 | Schena |
| 7,215,329 B2 | 5/2007 | Yoshikawa et al. |
| 7,227,537 B2 | 6/2007 | Nakayama et al. |
| 7,269,484 B2 | 9/2007 | Hein |
| 7,292,227 B2 | 11/2007 | Fukumoto et al. |
| 7,312,791 B2 | 12/2007 | Hoshino et al. |
| 7,324,094 B2 | 1/2008 | Moilanen et al. |
| 7,336,266 B2 | 2/2008 | Hayward et al. |
| 7,339,572 B2 | 3/2008 | Schena |
| 7,342,573 B2 | 3/2008 | Ryynanen |
| 7,385,308 B2 | 6/2008 | Yerdon et al. |
| 7,400,319 B2 | 7/2008 | Nakayama et al. |
| 7,450,110 B2 | 11/2008 | Shahoian et al. |
| 7,525,415 B2 | 4/2009 | Yatsu et al. |
| 7,548,232 B2 | 6/2009 | Shahoian et al. |
| 7,567,232 B2 | 7/2009 | Rosenberg |
| 7,579,758 B2 | 8/2009 | Maruyama et al. |
| 7,589,607 B2 | 9/2009 | Rochon et al. |
| 7,592,901 B2 | 9/2009 | Furusho |
| 7,592,999 B2 | 9/2009 | Rosenberg et al. |
| 7,602,384 B2 | 10/2009 | Rosenberg et al. |
| 7,607,087 B2 | 10/2009 | Prados |
| 7,855,715 B1 | 12/2010 | Bowen |
| 7,868,515 B2 | 1/2011 | Krochmal et al. |
| 7,969,288 B2 | 6/2011 | Braun et al. |
| 7,982,720 B2 | 7/2011 | Rosenberg et al. |
| 8,031,181 B2 | 10/2011 | Rosenberg et al. |
| 8,059,105 B2 | 11/2011 | Rosenberg et al. |
| 2001/0002648 A1 | 6/2001 | Van Zeeland |
| 2002/0054060 A1 | 5/2002 | Schena |
| 2002/0084721 A1 | 7/2002 | Walczak |
| 2002/0144886 A1* | 10/2002 | Engelmann et al. ........... 200/600 |
| 2002/0149561 A1* | 10/2002 | Fukumoto et al. ............ 345/156 |
| 2003/0067449 A1 | 4/2003 | Yoshikawa et al. |
| 2003/0209131 A1 | 11/2003 | Asahi |
| 2004/0252104 A1 | 12/2004 | Nakamura et al. |
| 2005/0017947 A1 | 1/2005 | Shahoian et al. |
| 2005/0073496 A1* | 4/2005 | Moore et al. ................... 345/156 |
| 2005/0157893 A1 | 7/2005 | Pelrine et al. |
| 2005/0204906 A1 | 9/2005 | Lengeling |
| 2005/0237309 A1 | 10/2005 | Sharma |
| 2006/0109256 A1* | 5/2006 | Grant et al. ................... 345/173 |
| 2006/0113880 A1* | 6/2006 | Pei et al. ........................ 310/800 |
| 2006/0256075 A1* | 11/2006 | Anastas et al. ................ 345/156 |
| 2006/0261983 A1 | 11/2006 | Griffin et al. |
| 2007/0031097 A1* | 2/2007 | Heikenfeld et al. ........... 385/129 |
| 2007/0074566 A1 | 4/2007 | Roundy et al. |
| 2007/0080951 A1 | 4/2007 | Maruyama et al. |
| 2007/0091070 A1 | 4/2007 | Larsen et al. |
| 2007/0146317 A1 | 6/2007 | Schena |
| 2007/0146334 A1 | 6/2007 | Inokawa |
| 2007/0152974 A1 | 7/2007 | Kim |
| 2007/0193436 A1 | 8/2007 | Chu |
| 2007/0234887 A1 | 10/2007 | Sawada et al. |
| 2007/0234890 A1 | 10/2007 | Yamashita |
| 2007/0236449 A1 | 10/2007 | Lacroix |
| 2007/0236450 A1* | 10/2007 | Colgate et al. ................ 345/156 |
| 2008/0083314 A1 | 4/2008 | Hayashi et al. |
| 2008/0084384 A1 | 4/2008 | Gregorio et al. |
| 2008/0092720 A1 | 4/2008 | Yamashita et al. |
| 2008/0100568 A1 | 5/2008 | Koch et al. |
| 2008/0289952 A1 | 11/2008 | Pelrine et al. |
| 2008/0302647 A1 | 12/2008 | Villain et al. |
| 2008/0303782 A1 | 12/2008 | Grant et al. |
| 2009/0002205 A1 | 1/2009 | Klinghult et al. |
| 2009/0046069 A1 | 2/2009 | Griffin et al. |
| 2009/0072662 A1 | 3/2009 | Sadler et al. |
| 2009/0128501 A1 | 5/2009 | Lazaridis et al. |
| 2009/0178913 A1 | 7/2009 | Peterson |
| 2009/0189790 A1 | 7/2009 | Peterson |
| 2009/0189873 A1 | 7/2009 | Peterson |
| 2009/0210568 A1 | 8/2009 | Peterson et al. |
| 2009/0219252 A1* | 9/2009 | Jarventie et al. .............. 345/173 |
| 2009/0231277 A1 | 9/2009 | Peterson |
| 2009/0255793 A1 | 10/2009 | Krochmal et al. |
| 2010/0109486 A1 | 5/2010 | Polyakov et al. |
| 2010/0156814 A1* | 6/2010 | Weber et al. .................. 345/173 |
| 2010/0231423 A1 | 9/2010 | Yang |
| 2011/0096013 A1 | 4/2011 | Krumpelman et al. |
| 2011/0128239 A1 | 6/2011 | Polyakov et al. |
| 2011/0227763 A1 | 9/2011 | Schlosser et al. |
| 2011/0227872 A1 | 9/2011 | Huska et al. |
| 2012/0043191 A1 | 2/2012 | Kessler et al. |
| 2012/0092263 A1 | 4/2012 | Peterson et al. |
| 2012/0169603 A1 | 7/2012 | Peterson et al. |

FOREIGN PATENT DOCUMENTS

| | | | |
|---|---|---|---|
| DE | 10126670 | 12/2002 | |
| DE | 2005002417 | 4/2005 | |
| DE | 2004005501 | 8/2005 | |
| EP | 0278916 A | 8/1988 | |
| EP | 0654727 | 5/1995 | |
| EP | 1310860 | 5/2003 | |
| EP | 1548776 | 6/2005 | |
| JP | 2005004365 A | 1/2005 | |
| JP | 2007173087 A | 7/2007 | |
| JP | 2008516348 A | 5/2008 | |
| JP | 2011233406 A | 11/2011 | |
| WO | WO-0191100 | 11/2001 | |
| WO | 02073587 A | 9/2002 | |
| WO | 2006042309 A1 | 4/2006 | |
| WO | WO-2009043605 | 4/2009 | |
| WO | 2009067708 A1 | 5/2009 | |
| WO | WO 2009067708 A1 * | 5/2009 | ............... G06F 3/01 |
| WO | WO-2009097358 | 8/2009 | |
| WO | WO-2009097359 | 8/2009 | |
| WO | WO-2009097361 | 8/2009 | |
| WO | WO-2009114827 | 9/2009 | |

OTHER PUBLICATIONS

"Haptics: Learning Through Touch", Retrieved from <http://ced.ncsu.edu/nanoscale/haptics.htm>, (2004), 5 pages.

(56) References Cited

OTHER PUBLICATIONS

Bark, Karlin "Functional Prototype I", Retrieved from: <http://bdml.stanford.edu/twiki/bin/view/Haptics/FunctionalPrototypeI?skin=print.pattern> on Feb. 4, 2006, (Aug. 9, 2005),3 pages.
"Touch-Hapsys", Available at <http://www.touch-hapsys.org>, Project start: Oct. 1, 2002,2 pages.
Pasquero, Jerome "Stimulation of the Fingertip by Lateral Skin Stretch", Retrieved from: <http://www.cim.mcgill.ca/~jay/index_files/research.htm> on Feb. 4, 2006, (Jun. 3, 2005),5 pages.
Wing, Alan et al., "Multidimensional Haptics Preliminary Report", Retrieved from <http://www.touch-hapsys.org>, (Sep. 21, 003),pp. 1-125.
Wu, Xingtao et al., "A Generalized Capacitance-Based Model for Electrostatic Micro-Actuators", Department of Physics, New Jersey Institute of Technology, Newark, NJ, 07102-1982 Department of Mechanical Engineering, Columbia University, NY 10027,pp. 1-23.
Jones, M. G., et al., "A Comparison of Learning with Haptic and Visual Modalities", National Science Foundation REC-0087389,(May 3, 2005),pp. 1-20.
Kajimoto, Hiroyuki et al., "Electro-Tactile Display with Tactile Primary Color Approach", *Graduate School of Information and Technology, The University of Tokyo*, (2004),2 pages.
Gorinevsky, Dimitry et al., "Adaptive Membrane for Large Lightweight Space Telescopes", *SPIE Astronomical Telescopes and Instrumentation*, (Aug. 2002),pp. 1-9.
Odell, D.L. et al., "MicroRobot Conveyance and Propulsion System Using Comb Drive and Parallel Plate Actuators: The ScuttleBot", *UC Berkley*, available at <http://www.everandever.com/dan/projects/eecs245/scuttlebot.pdf> on May 17, 2010, 4 pages.
Zou, Jun et al., "Design of a Wide Tuning Range Micromachined Tunable Capacitor for Wireless Communications", *First IEEE Electro/Information Technology, Conference*, Jun. 8-11, Chicago, IL, 2000, (Jun. 8-Jun. 11, 2000),6 pages.
Pasquero, Jerome "Stress: A Tactile Display Using Lateral Skin Stretch", *Thesis, Department of Electrical and Computer Engineering McGill University*, Montreal, (Oct. 2003),75 pages.
Jones, Lynette "Human Factors and Haptic Interfaces", Department of Mechanical Engineering, Massachusetts Institute of Technology,(2001),40 pages.
Yang, Gi-Hun "Novel Haptic Mouse System for Holistic Haptic Display and Potential of Vibrotactile Stimulation", Human-Robot Interaction Research Center Korea Advanced Institute of Science and Technology,(2005),17 pages.
Hollis, Ralph "Haptics", *Berkshire Encyclopedia of Human-Computer Interaction*, Berkshire Publishing Group,(2004),pp. 311-316.
"Proposed Experiment Protocol and Details", Retrieved from <http://bdml.stanford.edu/twiki/bin/view/Haptics/ProposedExperi0mentProtocolAndDetails> on Feb. 4, 2006, 5 pages.
Mok Ha, Soon et al., "Interpenetrating Polymer Networks for High-Performance Electroelastomer Artificial Muscles", *Department of Materials Science and Engineering, UCLA*, (2006),pp. 1-19.
Beavers, Alex "Basic Concepts for Commercial Applications of Electroactive Polymer Artificial Muscle", *Artificial Muscle Incorporated*, Menlo Park, CA, Available at <www.designfax.net/news/archive/03-07.../feature_1.asp>,10 pages.
Ashley, Steven "Artificial Muscles", *Scientific American*, Available at <www.sciam.com>,(Oct. 2003),pp. 53-59.
Pasquero, Jerome "Tactile Display Survey", *Technical Report TR-CIM 06.04*. Available at <http://www.cim.mcgill.ca/~jay/index_files/research_files/actuators.htm> on May 17, 2010, 6 pages.
"Haptic Touch Technology", Pacinian Corporation,(Nov. 2007),2 pages.
Bar-Cohen, Yoseph "Electroactive Polymers", Retrieved from: <http://electrochem.cwru.edu/ed/encycl/> on Oct. 21, 2005, Electrochemistry Encyclopedia,(Dec. 2004),7 pages.
Fontaine, Ebraheem I., "A Laboratory Demonstration of a Parallel Robotic Mechanism with Integrated EPAM Actuators", *Massachusetts Institute of Technology*, (Jun. 2002),pp. 1-14.
"Elastomers: Powerful Polymer", Retrieved from <http://appliancedesign.com/copyright/>, (Jun. 1, 2006),pp. 1-5.
Bar-Cohen, Yoseph "Worldwide Electroactive Polymers", (*Artificial Muscles*) *Newsletter*, vol. 2, No. 1, Available at: <http://eap.jpl.nasa.gov>,(Jul. 2000),pp. 1-16.
Pasquero, Jerome "Survey on Communication through Touch", *Technical Report: TR-CIM 06.04*, Center for Intelligent Machines Department of Electrical and Computer Engineering,(Jul. 2006),pp. 1-27.
"Touch and Haptics", *2004 IEEE/ RSJ International Conference on Intelligent Robots and Systems*, (Sep. 28, 2004),32 pages.
O'Halloran, A et al., "Materials and Technologies for Artificial Muscle: A Review for the Mechatronic Muscle Project", *Topics in Bio-Mechanical Engineering, Chapter 7*, Department of Electronic Engineering, National University of Ireland Galway,(2004),pp. 184-215.
Biggs, James "Some Useful Information for Tactile Display Design", *IEEE Transactions on Man-Machine Systems*, vol. 11, No. 1, (1970),pp. 19-24.
Raisamo, Roope "Tactile User Interfaces", *New Interaction Techniques*, (Aug. 2, 2001),pp. 1-30.
Bar-Cohen, Yoseph "Low Mass Muscle Actuators (LoMMAs)", Telerobotic Task Sponsored by NASA HQ, Code S,(Oct. 23, 1997),pp. 1-18.
"Role of Skin Biomechanics in Mechanoreceptor", Retrieved from <http://touchlab.mit.edu/oldresearch/currentwork/humanhaptics/roleofskinbiomechanics/> on Dec. 20, 2007, MIT Touch Lab,pp. 1-13.
Spires, Shelby G., "Artificial Strongman", *Smart Business: For the New Economy*, (Nov. 2000),1 page.
Sommer-Larsen, Peter "Artificial Muscles", *Rise National Laboratory, Condensed Matter Physics and Chemistry Department*, (1996),3 pages.
Bar-Cohen, Yoseph "Electric Flex", *IEEE Spectrum Online*, (Jun. 2004),6 pages.
Bar-Cohen, Yoseph "Electroactive Polymers as Artificial Muscles-Capabilities, Potentials and Challenges", *Robotics 2000*, Available at <www.spaceandrobotics>,(Feb. 28-Mar. 2, 2000),pp. 1-8.
Carpi, Federico et al., "Dielectric Elastomers as Electromechanical Transducers: Fundamentals, Materials, Devices, Models and Applications of an Emerging Electroactive Polymer Technology", *Elsevier LTD.*, (2008),12 pages.
Hayward, Vincent et al., "Tactile Display Device Using Distributed Lateral Skin Stretch", *Proceedings of the Haptic Interfaces for Virtual Environment and Teleoperator Systems Symposium*, ASME International Mechanical Engineering Congress & Exposition,(2000),pp. 1309-1314.
Seeger, Joseph I., et al., "Dynamics and Control of Parallel-Plate Actuators Beyond the Electrostatic Instability", *Transducers '99, The 10th International Conference on Solid State Sensors and Actuators*, (Jun. 1999),4 pages.
"Nanoactuators Based on Electrostatic Forces on Dieletrics", Retrieved from <http://www.nasatech.com/Briefs/Apr05/NPO30747.html> on Nov. 28, 2005, NASA's Jet Propulsion Laboratory, Pasadena, CA,4 pages.
Bar-Cohen, Yoseph et al., "Enabling Novel Planetary and Terrestrial Mechanisms Using Electroactive Materials at the JPL's NDEAA Lab", *2004 International Conference on MEMS, NANO, and Smart Systems*, Available at <http://ndeaa.jpl.nasa.gov>,(Aug. 2004),pp. 1-6.
Pei, Qibing et al., "Multiple-Degrees-of-Freedom Electroelastomer Roll Actuators", *Smart Materials and Structures*, vol. 13, SRI International Institute of Physics Publishing,(2004),pp. N86-N92.
"New SRI International Spin-Off, Artificial Muscle, Inc., Secure Series a Funding from Leading VC Firms", Retrieved from <http://www.sri.com/news/releases/05-03-04.html> on Jan. 30, 2008, SRI International Spin Offs Artificial Muscle, Inc,(May 2004),2 pages.
Jager, Edwin W., et al., "Microfabricating Conjugated Polymer Actuators", *Science Magazine*, vol. 290, www.sciencemag.org,(Nov. 24, 2000),pp. 1540-1544.
Wingert, Andreas et al., "On the Kinematics of Parallel Mechanisms with Bio-stable Polymer Actuators", Department of Mechanical Engineering, Massachusetts Institute of Technology Cambridge,(2002),8 pages.

(56) References Cited

OTHER PUBLICATIONS

"Non Final Office Action", U.S. Appl. No. 11/945,879, (Feb. 13, 2009),8 pages.
Bicchi, Antonio et al., "Haptic Illusions Induced by Tactile Flow", *Interdepartmental Research Centre "E. Piaggo", University of Pisa*, Available at <www.eurohaptics.vision.ee.ethz.ch/2003/38.pdf>,(2003),12 pages.
Wagner, Christopher et al., "Integrating Tactile and Force Feedback with Finite Element Models", *Proceedings of the 2005 IEEE international Conference on Robotics and Automation*, Apr. 18-22, 2005, Division of Engineering and Applied Sciences, Harvard University,6 pages.
Bar-Cohen, Y. "Electroactive Polymer (EAP) Actuators as Artificial Muscles—Reality, Potential and Challenges", *SPIE Press*, (Mar. 18, 2004),pp. 26 and 548-550.
Van De Mortel, Dirk "Exploration of Smart Materials for the Use of User-System Interaction", *User System Interaction. Faculty Industrial Design. TU/e*, (Apr. 2002),pp. 21-24.
"PCT Search Report", Application Serial No. PCT/US2009/032288, (Apr. 29, 2009),13 pages.
"PCT Search Report", Application Serial No. PCT/US2009/037191, (May 28, 2009),11 pages.
"Non Final Office Action", U.S. Appl. No. 11/945,879, (Jul. 9, 2009),16 pages.
"PCT Search Report", Application Serial No. PCT/US2009/032292, (Aug. 11, 2009),17 pages.
"PCT Search Report", Application No. PCT/US2009/032289, (Dec. 23, 2009),13 pages.
"Notice of Allowance", U.S. Appl. No. 11/945,879, (Feb. 23, 2010),6 pages.
"PCT Search Report and Written Opinion", Application No. PCT/US2010/020380, (Apr. 12, 2010),13 pages.
Non-Final Office Action mailed May 14, 2012, U.S. Appl. No. 13/323,292, 19 pages.
United States Patent and Trademark Office, US Non-final Office Action for U.S. Appl. No. 12/975,733 dated Oct. 25, 2013.
Bifano, Thomas "Parallel Plate Electrostatic Actuation for High-Resolution Deformable Mirrors", Boston University, (Aug. 19, 2004),35 pages.
Bifano, Thomas, "Parallel Plate Electrostatic Actuation for High-Resolution Deformable Mirrors", Boston University, Boston, MA, Aug. 19, 2004.
Fukumoto, Masaki, et al, "Active Click: Tactile Feedback for Touch Panels", NTT DoCoMo Multimedia Labs, Mar. 31, 2001, 2 pages.
MacKenzie, Scott, et al, "The Tactile Touchpad", 1997, 5 pages.
Mackenzie, Scott, et al., "A Comparison of Three Selection Techniques for Touchpads", Proceedings of the CHI'98 Conference on Human Factors in Computing Systems, pp. 336-343 New York 1998.
Oniszczak, Aleks, "VersaPad Driver Plus Pack", 1999, 3 pages.
Poupyrev, Ivan, et al., "Tactile Interfaces for Small Touch Screens", 2003, 4 pages.
Poupyrev, Ivan, et al., "TouchEngine: A Tactile Display for Handheld Devices", 2002, 2 pages.
Seeger, Joseph et al., "Dynamics and Control of Parallel-Plate Actuators Beyond the Electrostatic Instability", Transducers ''99 The 10th International Conference on Solid State Sensors and Actuators, (Jun. 1999),pp. 474-477.
"International Search Report and Written Opinion", Application No. PCT/US2010/020380, (Apr. 12, 2010),10 pages.
Jungmann, M., et al, Miniaturised Electrostatic Tactile Display with High Structural Compliance, 2002, 6 pages.
Wagstaff, Jeremy, "A Passion for the Keys", The Wall Street Journal Online, Nov. 23, 2007, 3 pages, retrieved from the Internet at online.wsj.com/article_print/SB119578337324301744.html.
"Supplemental Notice of Allowance", U.S. Appl. No. 11/945,879, (May 20, 2010),5 pages.
USPTO, Non-Final Office Action in U.S. Appl. No. 12/975,733, mailed Oct. 25, 2012.
USPTO, Response to Non-Final Office Action in U.S. Appl. No. 12/975,733, mailed Feb. 28, 2013.
USPTO, Final Office Action in U.S. Appl. No. 12/975,733, mailed May 10, 2013.
State Intellectual Property Office of the People's Republic of China, Office Action in Chinese Patent Application No. 201080008902.X, mailed Aug. 26, 2013.
State Intellectual Property Office of the People's Republic of China, Search Report in Chinese Patent Application No. 201080008902.X, mailed Aug. 26, 2013.
State Intellectual Property Office of the People's Republic of China, Observations and Amended Claims in Lieu of Response to Chinese Office Action in Chinese Patent Application No. 201080008902.X, mailed Jan. 10, 2014.
Japan Patent Office, Pending Claims and Notice of Reasons for Rejection in Japanese Patent Application No. P2011-545432, mailed Feb. 18, 2014.
Japan Patent Office, Amendments to Claims in Lieu of Response to Notice of Reasons for Rejection in Japanese Patent Application No. P2011-545432, mailed Mar. 11, 2014.

\* cited by examiner

Optional USB interface allows realtime changes of haptic profiles, and can act as a HID compliant keyboard.

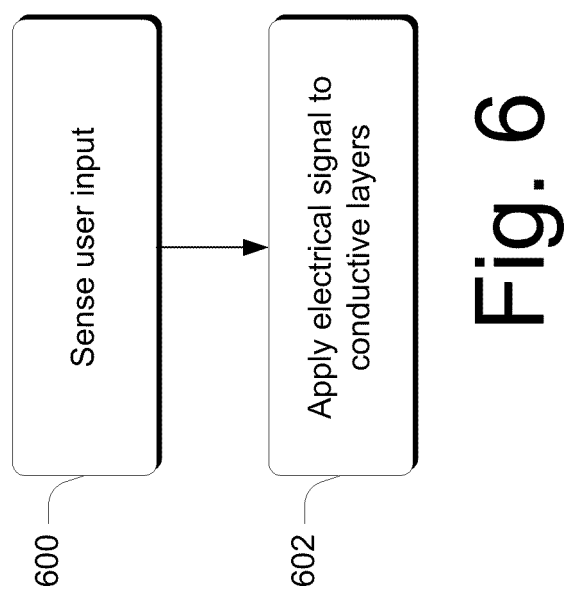

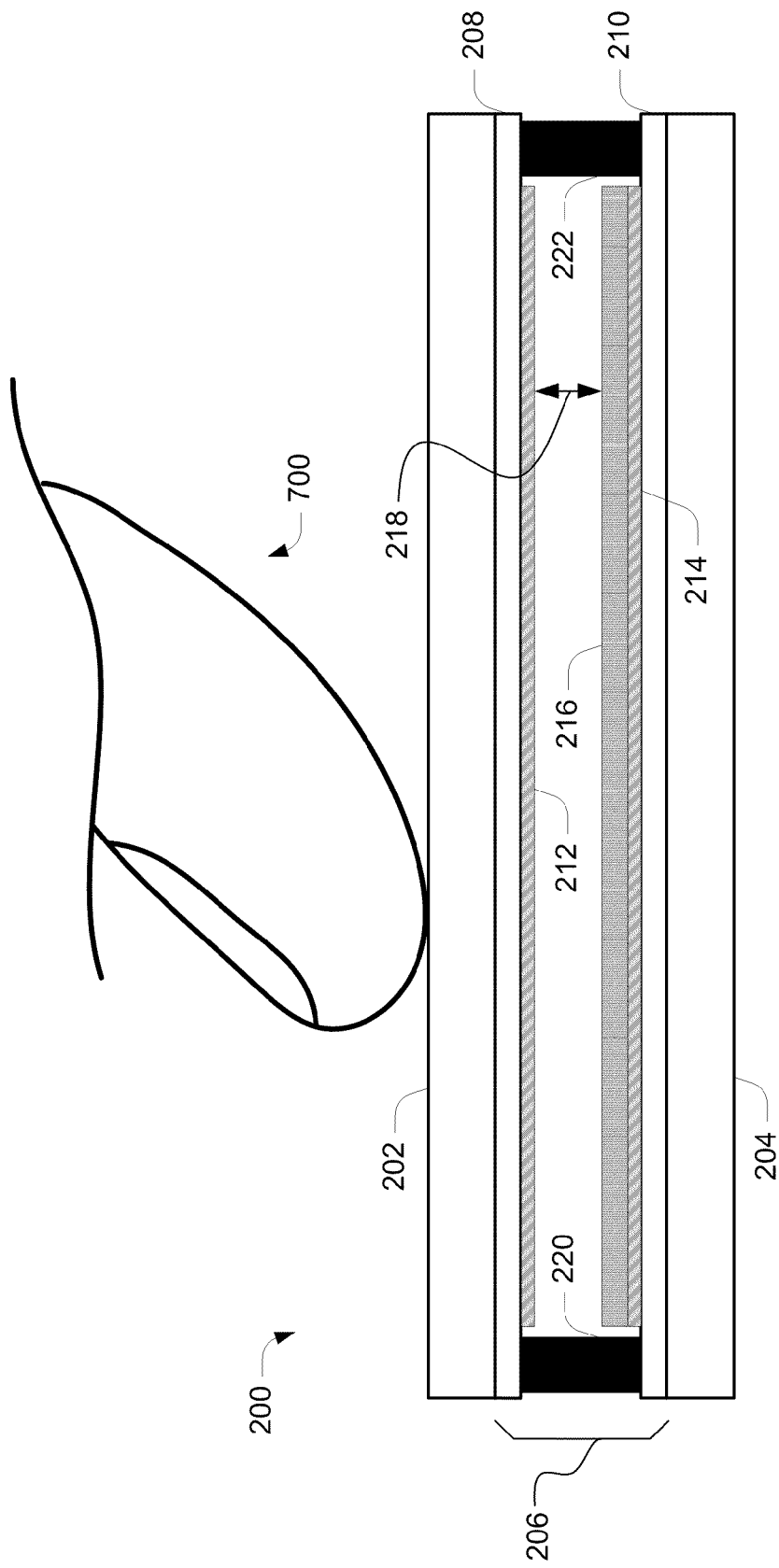

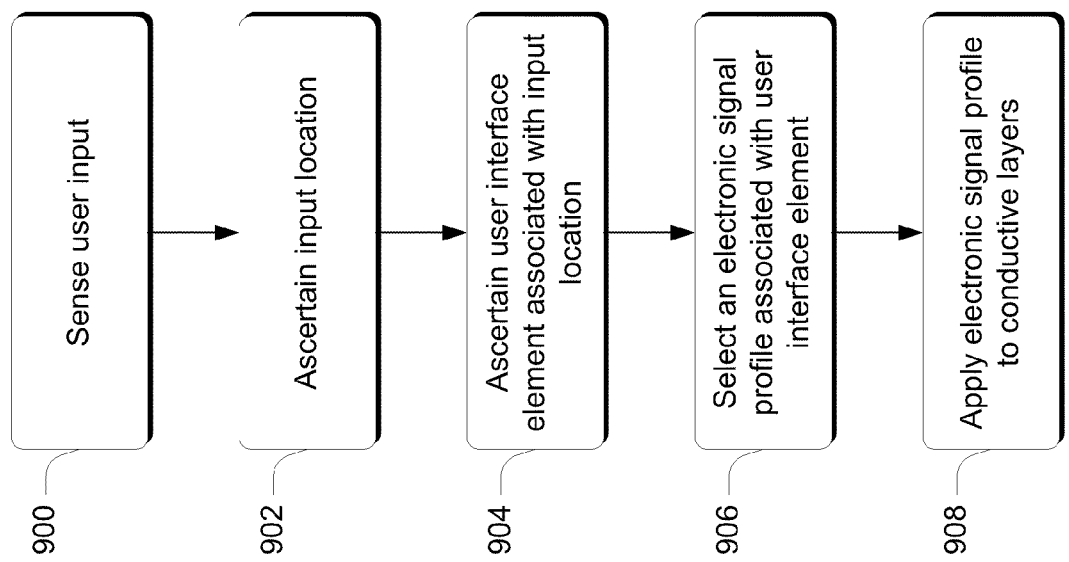

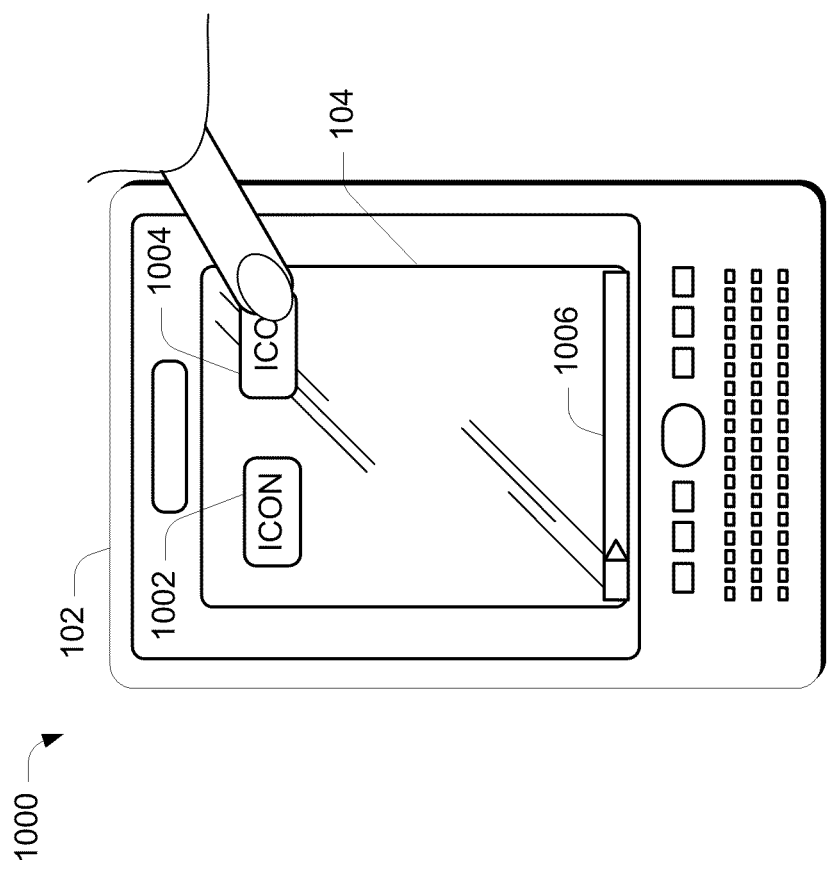

TACTILE SURFACE

RELATED APPLICATIONS

This application claims priority to U.S. Provisional Application No. 61/143,203 filed on Jan. 8, 2009, and to U.S. Provisional Application No. 61/171,646 filed on Apr. 22, 2009, the disclosures of which are incorporated by reference herein.

BACKGROUND

Today there are a limited number of options that allow touch pads or touch screens to possess and provide tactile feedback to their users. Some of these options include using electromechanical linear or rotary motors which consume a significant amount of power, have a slow response time, and do not provide "point of touch" or localized tactile feedback. That is, they typically vibrate the entire device. Other options include using piezo elements, which are generally fragile and expensive and provide very little movement back to the user; or, using large electro-magnetic solenoid type actuators that consume a significant amount of power and require complex mechanical assembly.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one or more embodiments, two conductive surfaces are utilized and suitably driven to provide movement of at least one of the surfaces through attractive and/or repellant forces. The movement of the surfaces can be harnessed or utilized to provide a variety of functionality.

In one or more embodiments, a device includes a surface and an actuator mechanism operably associated with the surface. The actuator mechanism is configured to provide tactile feedback to a user in contact with the surface. In at least some embodiments, the actuator mechanism comprises a pair of spaced-apart substrates each of which supports a conductive layer of material. In at least some embodiments, a dielectric material and an adjacent air gap are interposed between the substrates. The device also includes drive circuitry operably connected to the spaced-apart substrates. The drive circuitry is configured to drive the conductive layers of material with an electrical signal. Driving the conductive layers with the electrical signal causes one or more of the corresponding substrates to be moved either or both of towards one another or away from one another. In some embodiments, the drive circuitry can use different drive profiles to drive the conductive layers to provide various tactile or audio feedback to the user.

In other embodiments, a device includes an actuator mechanism that is configured to provide tactile or audio feedback to a user. In at least some embodiments, the actuator mechanism comprises a pair of spaced-apart substrates each of which supports a conductive layer of material. At least one of the substrates supports, either directly or indirectly, or is otherwise in operative contact with a user input mechanism by which a user can provide input to the device. In at least some embodiments, a dielectric material and an adjacent air gap are interposed between the substrates. The device also includes drive circuitry operably connected to the spaced-apart substrates. The drive circuitry is configured to drive the conductive layers of material with an electrical signal. Driving the conductive layers with an electrical signal causes movement of one or both of the substrates. In some embodiments, the drive circuitry can use different drive profiles to drive the conductive layers to provide various tactile feedback to the user through the user input mechanism.

In at least some embodiments, the electrical signal that drives the conductive layers can be generated responsive to: user input or interaction, software events, and/or external triggers such as interaction with others, alerts, messages, reminders and the like. With respect to user interaction, such can occur through, for example, a touch screen, touch pad, keyboard, key pad, discrete switches (mechanical or digital), linear or rotary motion sensing, proximity, interactive content, invalid entry, limits and the like.

BRIEF DESCRIPTION OF THE DRAWINGS

The same numbers are used throughout the drawings to reference like features.

FIG. 6 is a flow diagram that describes steps in a method in accordance with one or more embodiments.

FIG. 7 illustrates a side sectional view of an example material assembly in accordance with one or more embodiments.

FIG. 9 is a flow diagram that describes steps in a method in accordance with one or more embodiments.

FIG. 10 illustrates the device of FIG. 1 in accordance with another embodiment.

DETAILED DESCRIPTION

Overview

Figure 1:
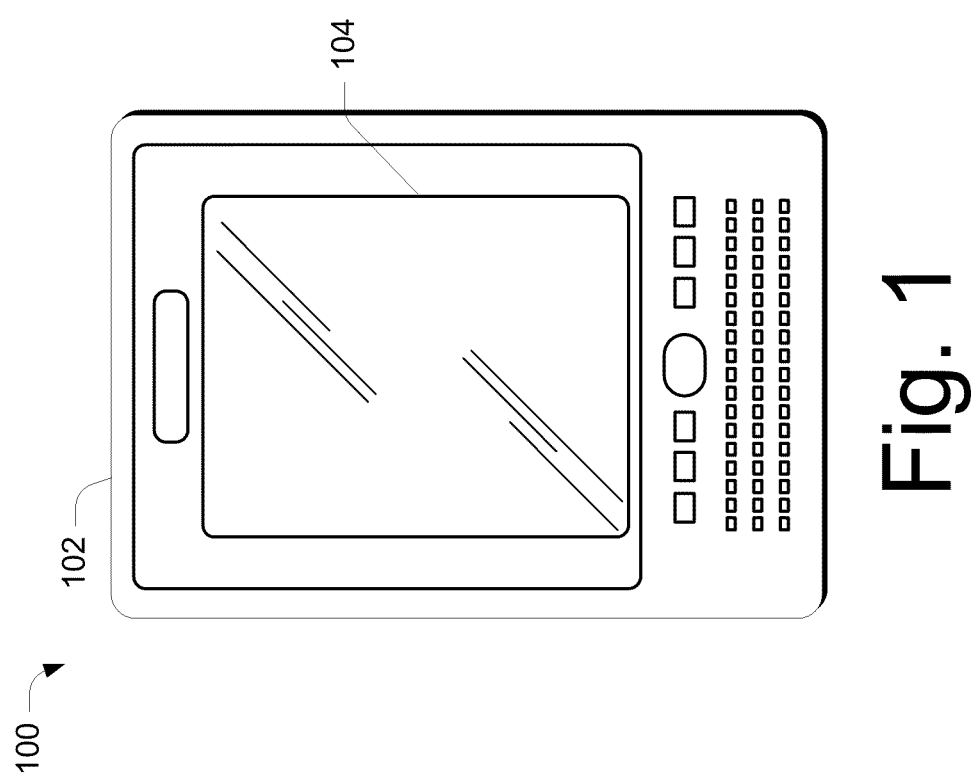
FIG. 1 illustrates an example device in accordance with one or more embodiments.

In one or more embodiments, two conductive surfaces are utilized and suitably driven to provide movement of at least one of the surfaces through attractive and/or repellant forces. The movement of the surfaces can be harnessed or utilized to provide a variety of functionality. Any suitable type of material can be used for the conductive surfaces. For example, the conductive surfaces can be formed as part of a transparent substrate. Alternately or additionally, the conductive surfaces can be formed from material that is not transparent, e.g., a metal material.

In one or more embodiments, a device includes a surface and an actuator mechanism operably associated with the surface. The actuator mechanism is configured to provide tactile feedback to a user in contact with the surface. In at least some embodiments, the actuator mechanism comprises a pair of spaced-apart substrates each of which supports a conductive layer of material. In at least some embodiments, a dielectric material and an adjacent air gap are interposed between the substrates. The device also includes drive circuitry operably connected to the spaced-apart substrates. The drive circuitry is configured to drive the conductive layers of material with an electrical signal. Driving the conductive layers with the electrical signal causes one or more of the corresponding substrates to be moved either or both of towards one another or away from one another. In some embodiments, the drive circuitry can use different drive profiles to drive the conductive layers to provide various tactile or audio feedback to the user.

In other embodiments, a device includes an actuator mechanism that is configured to provide tactile or audio feedback to a user. In at least some embodiments, the actuator mechanism comprises a pair of spaced-apart substrates each of which supports a conductive layer of material. At least one of the substrates supports, either directly or indirectly, or is otherwise in operative contact with a user input mechanism by which a user can provide input to the device. In at least some embodiments, a dielectric material and an adjacent air gap are interposed between the substrates. The device also includes drive circuitry operably connected to the spaced-apart substrates. The drive circuitry is configured to drive the conductive layers of material with an electrical signal. Driving the conductive layers with an electrical signal causes movement of one or both of the substrates. In some embodiments, the drive circuitry can use different drive profiles to drive the conductive layers to provide various tactile feedback to the user through the user input mechanism.

In at least some embodiments, the electrical signal that drives the conductive layers can be generated responsive to: user input or interaction, software events, and/or external triggers such as interaction with others, alerts, messages, reminders and the like. With respect to user interaction, such can occur through, for example, a touch screen, touch pad, keyboard, key pad, discrete switches (mechanical or digital), linear or rotary motion sensing, proximity, interactive content, invalid entry, limits and the like. In the discussion that follows, a section entitled "Example Device" is provided and gives but one example of a device that can utilize the inventive principles described herein. After this, a section entitled "Example Material Assembly" describes a material assembly, including an actuator mechanism, in accordance with one or more embodiments. Following this, a section entitled "Example Components" describes example components in accordance with one or more embodiments. Next, a section entitled "Embodiment with User Input Mechanism" describes an alternate embodiment. Following this, a section entitled "Example Method" describes a method in accordance with one or more embodiments. Next, a section entitled "Varying Feedback Based upon User Interface Element" describes embodiments in which feedback is varied based upon the type of user interface element engaged by user.

Example Device

FIG. 1 illustrates an example device in accordance with one or more embodiments generally at 100. Device 100 includes a housing 102 and a surface 104 supported by the housing. Surface 104 can comprise any suitable type of surface. In this particular example, surface 104 comprises a touch surface that is configured to receive user input via touch. It is to be appreciated and understood, however, that surfaces other than touch surfaces can be utilized in connection with the principles described herein.

Touch surface 104 can comprise any suitable type of touch surface that can be physically engaged or touched by a user. In this particular example, touch surface 104 is embodied as a touch screen on a hand-held device. The touch screen can be formed from any suitable type of material such as glass or plastic and can be any suitable size. For example, a suitable touch screen may form part of a larger display device, such as a desktop monitor. Alternately or additionally, the touch screen may form part of a device on a vehicle such as, by way of example and not limitation, a user interface associated with a vehicle radio, climate control, navigation system, and/or a navigation instrumentality such as a GPS-supported navigation aid, and the like.

Alternately or additionally, in at least some other embodiments, the touch surface 104 can be embodied as a touch pad, such as one would find on a laptop computer, keyboard or button panel.

Having considered an example device, consider now an example material assembly that can provide the actuator mechanism described above and below.

Example Material Assembly

Figure 2:
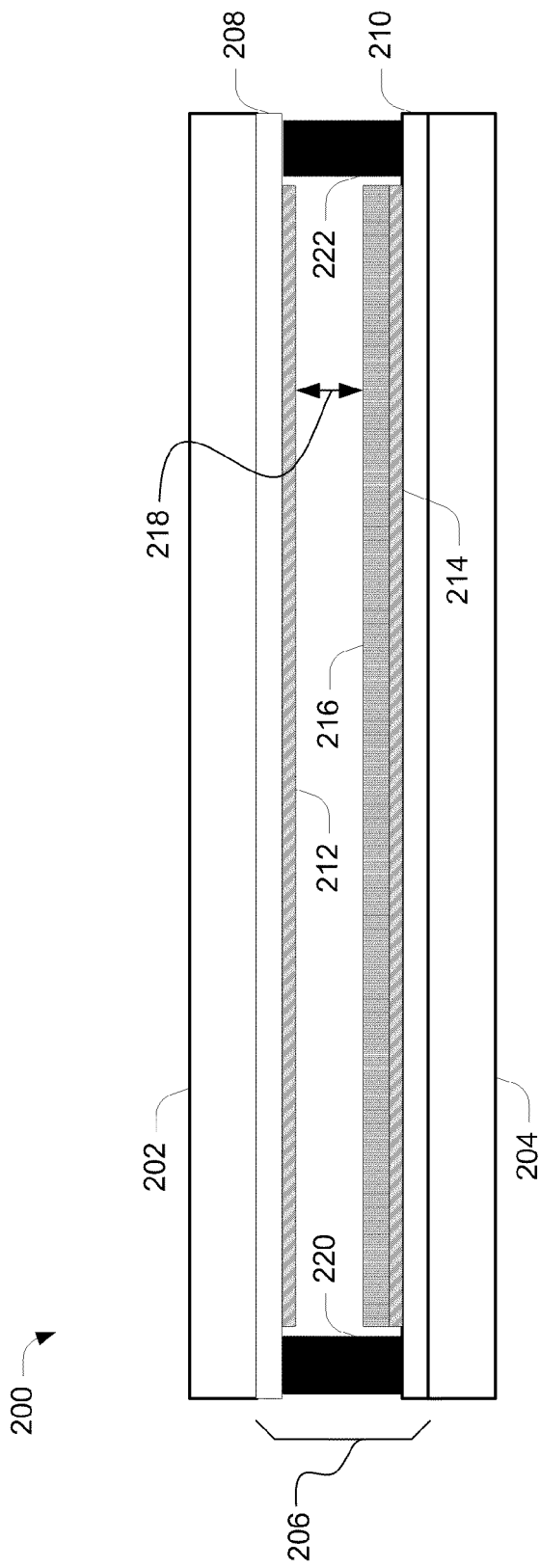
FIG. 2 illustrates a side sectional view of an example material assembly in accordance with one or more embodiments.

FIG. 2 illustrates a side sectional view of an example material assembly in accordance with one or more embodiments generally at 200. In this example, material assembly 200 includes a surface in the form of a screen 202 and a display 204 such as, for example, a liquid crystal display. Any suitable type of display can, however, be used.

Material assembly 200 also includes an actuator mechanism 206 operably associated with the screen 202. The actuator mechanism is configured to provide tactile feedback to a user responsive to a user touching or otherwise engaging the screen 202. In at least some embodiments, the actuator mechanism 206 comprises a pair of spaced-apart substrates 208, 210 each of which supports a conductive layer of material 212, 214 respectively. It is to be appreciated and understood, however, that substrates 208, 210 may individually be comprised of conductive material.

Display 204 is disposed operably adjacent substrate 210. In at least some embodiments, a dielectric material 216 and an adjacent air gap 218 are interposed between the substrates 208, 210. In addition, actuator mechanism 206 may also include a spring mechanism 220, 222. Any suitable type of spring mechanism can be utilized such as various types of mechanical springs, rubberized springs, rubberized stoppers, elastomeric material, resilient gasket material, and the like. Examples of suitable types of springs and spring mechanisms are described in U.S. Provisional Application No. 61/143,203 incorporated by reference above.

Any suitable type of materials can be utilized to provide components of the material assembly 200.

For example, in at least some embodiments, substrates 208, 210 can be formed from a clear material such as plastic or glass. Additionally, the conductive layers of material 212, 214 can comprise any suitable type of conductive material. Alternately or additionally, the substrates may comprise material with conductive properties. For example, in at least some embodiments, at least one of the substrates can be formed from a conductive material such as sheet metal. Other materials can, of course, be utilized without departing from the spirit and scope of the claimed subject matter.

In at least some embodiments, the conductive material is a clear conductive material. Alternately or additionally, in at least some embodiments, the conductive material is a spray-on material or film that is applied, coated or otherwise deposited (as through any of a variety of deposition techniques such as, by way of example and not limitation, CVD, PECVD, and the like) onto the surfaces of substrates 208, 210. Alternately or additionally, in at least some embodiments, the conductive material can comprise indium tin oxide, silver, copper, or any other suitable type of conductive material.

Dielectric material 216 can comprise any suitable type of dielectric material such as, by way of example and not limitation, air, glass, plastic, elastomeric material, gels and/or other fluidic or non-fluidic materials.

In one or more embodiments, various parameters associated with the material assembly 200 can be selected in order to provide desired operating characteristics. For example, parameters associated with the dimension of air gap 218 and the dielectric constant of dielectric material 216 can be selected in order to provide desired operating characteristics. In at least some embodiments, the following parameter values can be used:

| Parameter | Value |
|---|---|
| Air gap dimension | 0.1 to 1.0 mm |
| Dielectric constant | Greater than or equal to 1 |

Having considered an example material assembly, consider now example components that can be used in connection with the material assembly to provide a user with tactile feedback.

Example Components

Figure 3:
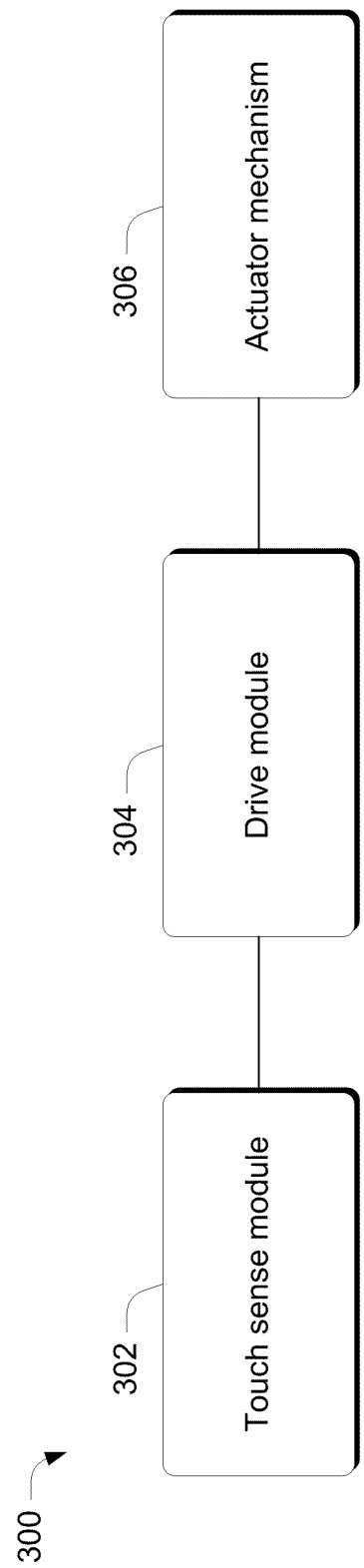
FIG. 3 illustrates some example components in accordance with one or more embodiments.

FIG. 3 illustrates some example components in accordance with one or more embodiments generally at 300. Components 300 include a touch sense module 302, a drive module 304, and an actuator mechanism 306. Actuator mechanism 306 corresponds, in this example, to actuator mechanism 206 in FIG. 2. Any suitable hardware, software, and/or firmware can be used to implement touch sense module 302 and drive module 304.

With respect to touch sense module 302, any suitable type of technology can be utilized to implement the touch sense module such that it is capable of sensing when a user has touched or otherwise engaged the touch screen. Examples of suitable, known technologies include, by way of example and not limitation, capacitive field technology, resistive technology, optical, field effect, force/pressure, inductive, Hall effect, and the like.

Drive module 304 includes drive circuitry operably connected to the spaced-apart substrates of actuator mechanism 306. The drive circuitry is configured to drive the conductive layers of material with an electrical signal responsive to an input such as, by way of example and not limitation, sensing a touch input, software events, and/or other triggers or occurrences such as those mentioned above. Driving the conductive layers causes one or more of the corresponding substrates to be moved either or both of towards one another or away from one another. In some embodiments, the drive circuitry can use different drive profiles to drive the conductive layers to, in at least some embodiments, provide various tactile feedback to the user. The drive profiles can include, by way of example and not limitation, a series of voltage pulses having various frequencies, As an example of suitable drive circuitry, consider FIGS. 4a-4f.

Figure 4A:
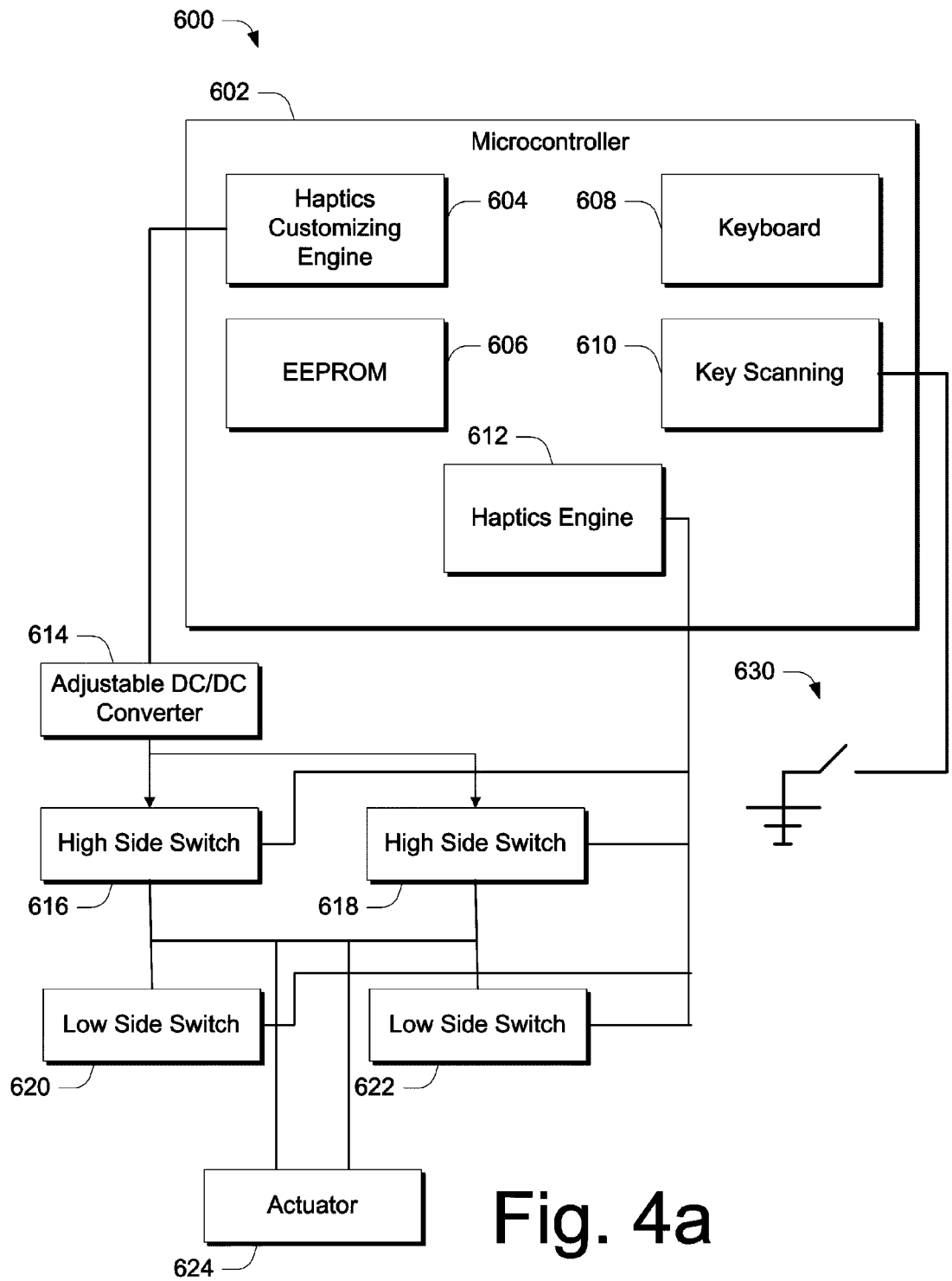
FIG. 4a illustrates a high-level block diagram of example system in accordance with one or more embodiments.

FIG. 4a illustrates a high-level block diagram of an example system, generally at 600, that can be incorporated into a keyboard or similar device and utilized to implement the functionality described above and below. In the illustrated and described example, system 600 includes a microcontroller 602 which, in turn, includes a haptics customizing engine 604, a computer-readable storage media in the form of an EEPROM 606, a keyboard component 608, a key scanning component 610, and a haptics engine 612. In addition, system 600 includes an adjustable DC/DC converter 614, high side switches 616, 618, low side switches 620, 622, and an actuator 624.

In addition, a switch is illustrated generally at 630 and represents aspects of a touch surface that is configured to detect a user's engagement. Detection of a user's engagement can occur using any suitable type of sensor or detection apparatus. For example, in at least some embodiments, a mechanical switch, membrane switch, a capacitive-type sensor or a projected field-type sensor, surface acoustic wave, infrared display, optical/imaging resolution, and/or image sensing can be employed to sense a user's engagement. The operating principles of these types of sensors are generally known and, for the sake of brevity, are not described in detail here other than the explanation that appears just below.

In at least some embodiments, the detection apparatus establishes a sensory field that overlays a portion or all of a touch surface effective to define a sensor layer. The sensor layer can be considered as a region in which the presence and/or movement of a user, such as a user's finger, can be detected by the sensor layer. When the user's presence and/or movement is sensed by the sensor layer, an electrical signal can be sent to the drive electronics to effectively drive the substrates to cause the touch surface to move in a desired fashion.

As shown, haptics customizing engine 604 is connected to the adjustable DC/DC converter 614 which, in turn, is connected to high side and low side switches 616, 618 and 620, 622 respectively. Actuator 624 is operably connected to the high side and low side switches as shown. The switches, both high side and low side are connected to haptics engine 612.

In operation, in one or more embodiments, haptics customizing engine 604 is configured to load predefined haptic profiles from EEPROM 606 or modify parameters of existing profiles, either upon user/host request or by request from a self-adapting haptic hardware/software system. In addition, in one or more embodiments, haptics customizing engine 604 is configured to load new profiles to the haptics engine 612 or save new profiles to the EEPROM 606 as defined by a user or hardware/software developer. EEPROM 606 is configured to store haptic profile information for use in the haptic engine 612. This information can be predefined at production time, as well as updated or supplemented at runtime by users, host system, developers, or an adaptive module of the haptic system.

HID keyboard components 608 is configured to provide Human Interface Device functionality to the host system (if necessary) in order to allow the haptic system to act in the same manner as a keypad, keyboard, touchpad, mouse, and also to provide haptic information to the host for display, modification, or other use.

Key scanning component 610 is configured to provide a mechanism for the haptic system to know when it should trigger playback of a haptic profile. The haptic system does not need to directly scan keys itself. Rather, the haptic system can alternatively take key/switch/input state information from another device, such as a keyboard controller, touch screen controller, or other user input device.

Haptics engine 612 is configured to control the input signals to the haptic actuator based on profile data supplied by the EEPROM 606, haptics customization engine 604, and/or whatever other sources of data exist.

The adjustable DC/DC converter is configured to supply the actuator operating voltage. The output voltage may or may not be regulated, may or may not be adjustable on the fly, or may or may not be adjustable at all. The DC/DC converter may or may not have any common or uncommon features of typical power supplies, such as over current protection, under voltage protection, sleep mode, off mode, voltage feedback, etc. On the fly adjustment allows the output voltage to be adjustable such that the host or haptics customization engine 604 can modify the output voltage.

In operation, in one or more embodiments, the high side and low side switches are configured to drive the voltage of an actuator phase to the actuator's maximum positive operating voltage, maximum negative operating voltage, or any voltage in between, including ground or a high impedance (floating) potential.

Having described an example electronic device, consider now a discussion of example circuitry that can be utilized to implement the embodiments described above.

Figure 4B:
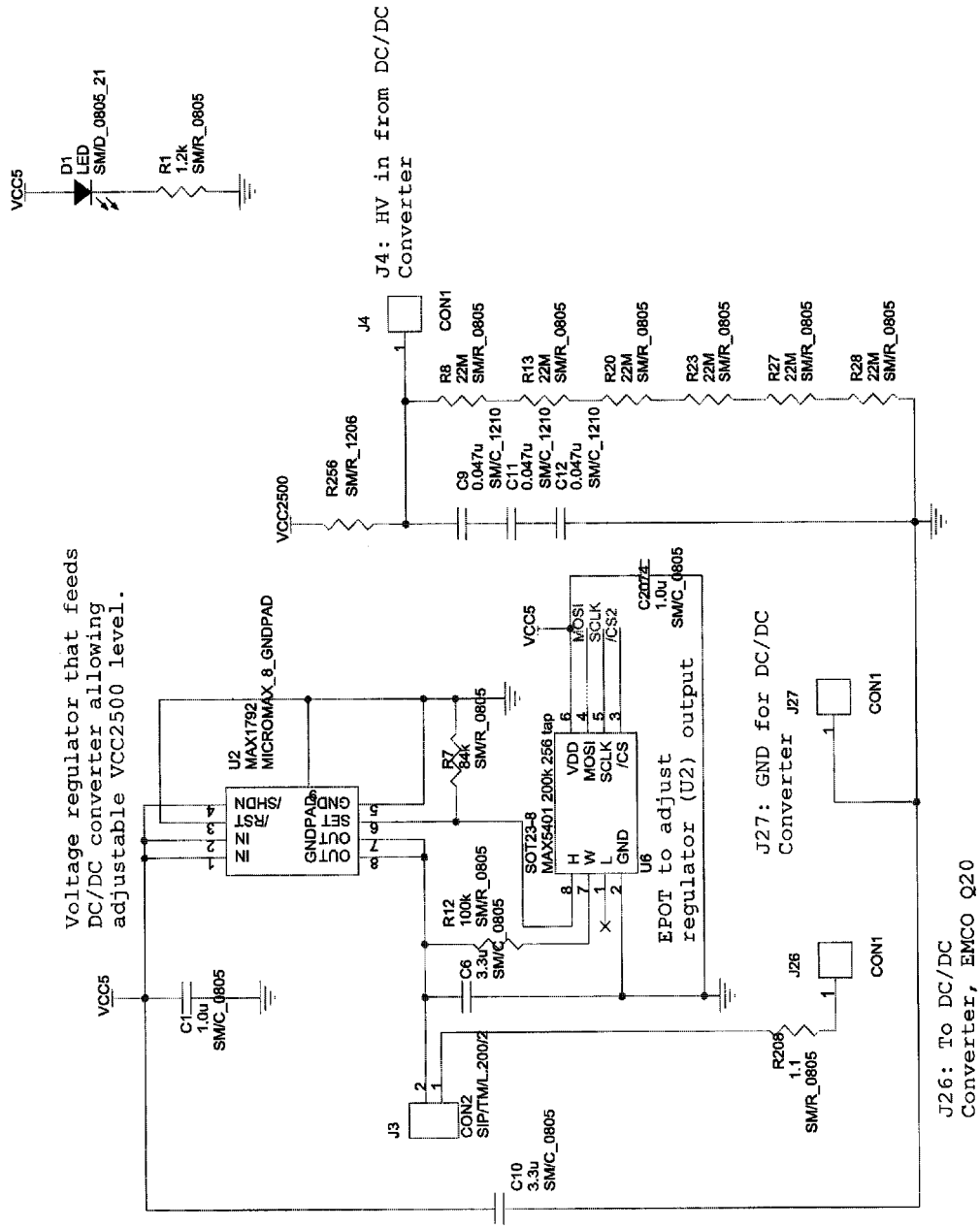
FIG. 4b illustrates an example voltage regulator in accordance with one or more embodiments.

FIG. 4*b* illustrates an example voltage regulator in accordance with one or more embodiments. In this example, the adjustable, low voltage regulator feeds a high voltage DC/DC converter, such as converter 614 in FIG. 4*a*, to allow a real-time adjustable high voltage level. In this example, a linear regulator with resistor-adjusted output voltage is used to drive a DC/DC converter whose output voltage is proportional to its input voltage. Additionally, the resistor path that controls the output voltage of the linear regulator contains an electrically-controlled potentiometer with a serial interface. This allows a microcontroller to serially set the resistance of the feedback branch and control the output of the linear regulator which in turn drives the DC/DC converter and controls the actuator drive voltage. It is to be appreciated there are many other ways to use regulated and unregulated supplies to provide the necessary operating voltage, and also that an adjustable high voltage rail is not necessary for every implementation, although if adjustability is required there are additionally many ways of providing adjustability.

Figure 4C:
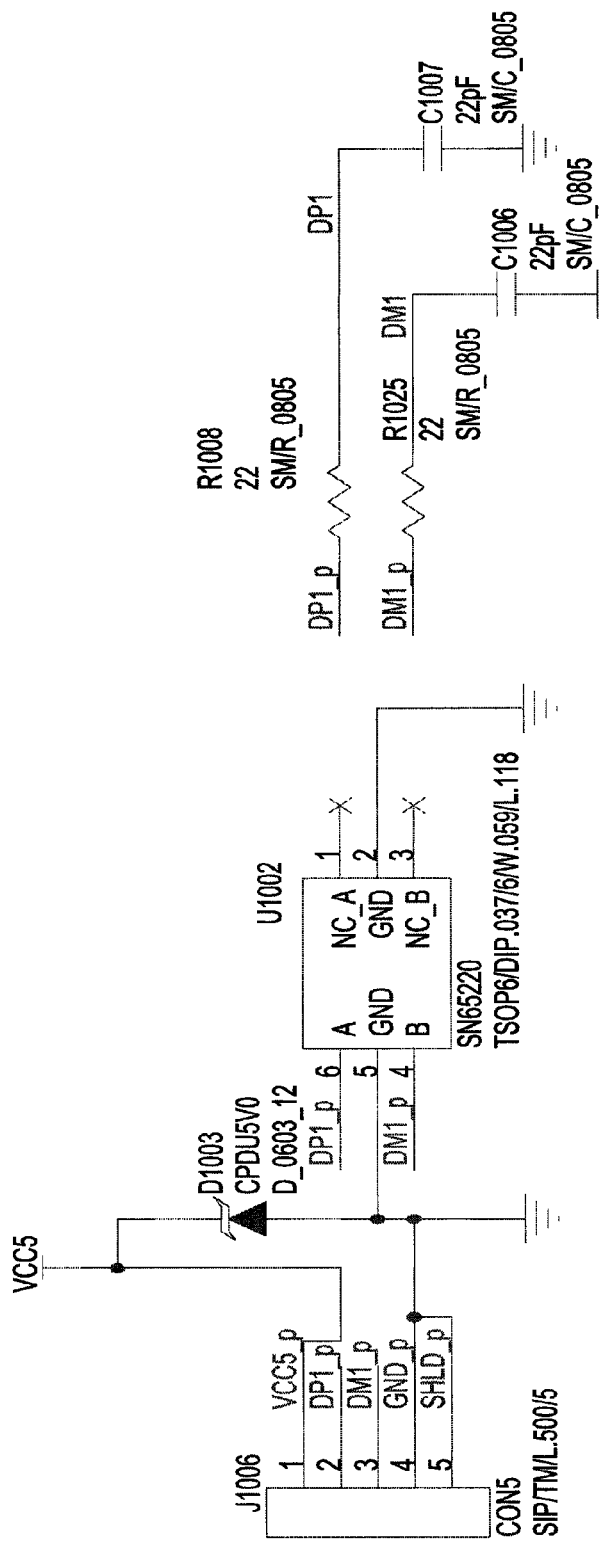
FIG. 4c illustrates a USB interface that can allow real-time changes of haptic profiles in accordance with one or more embodiments.
Figure 4D:
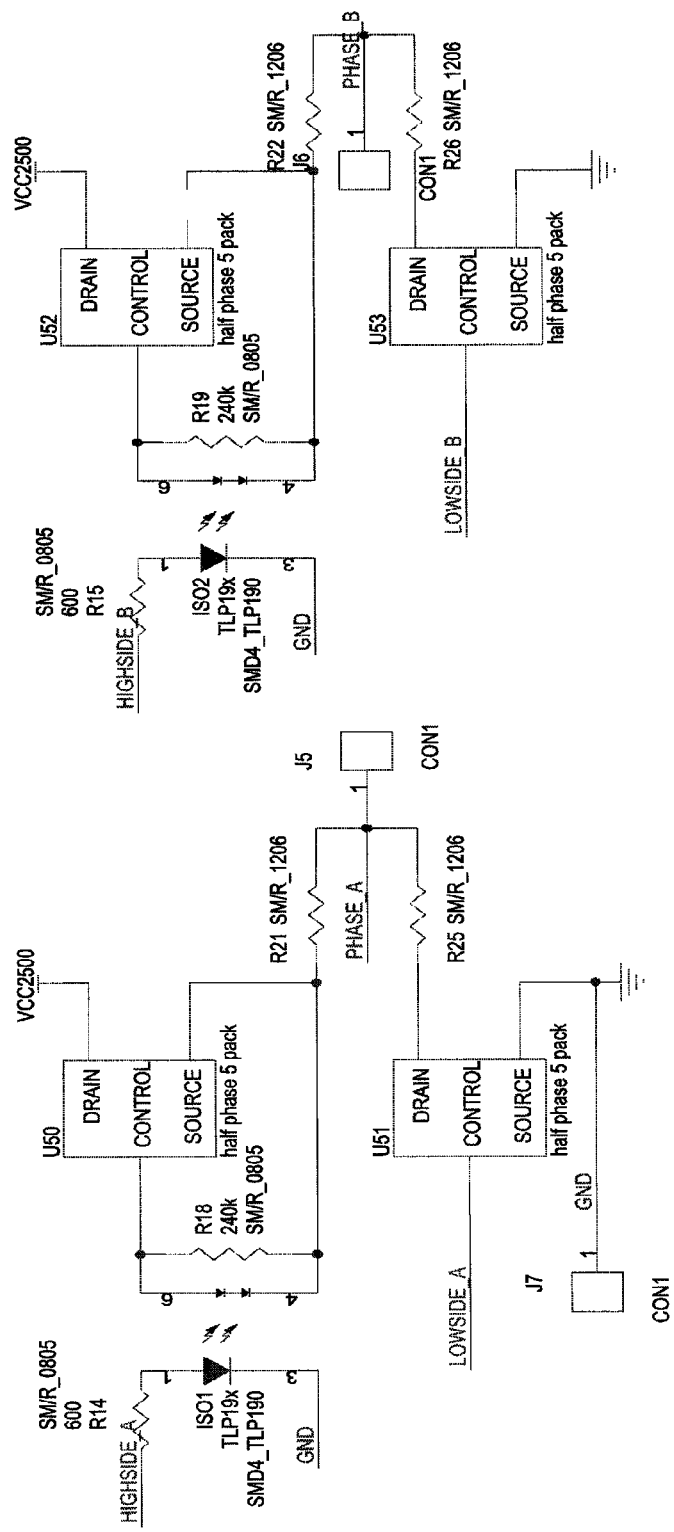
FIG. 4d illustrates an electronic circuit in accordance with one or more embodiments.
Figure 4E:
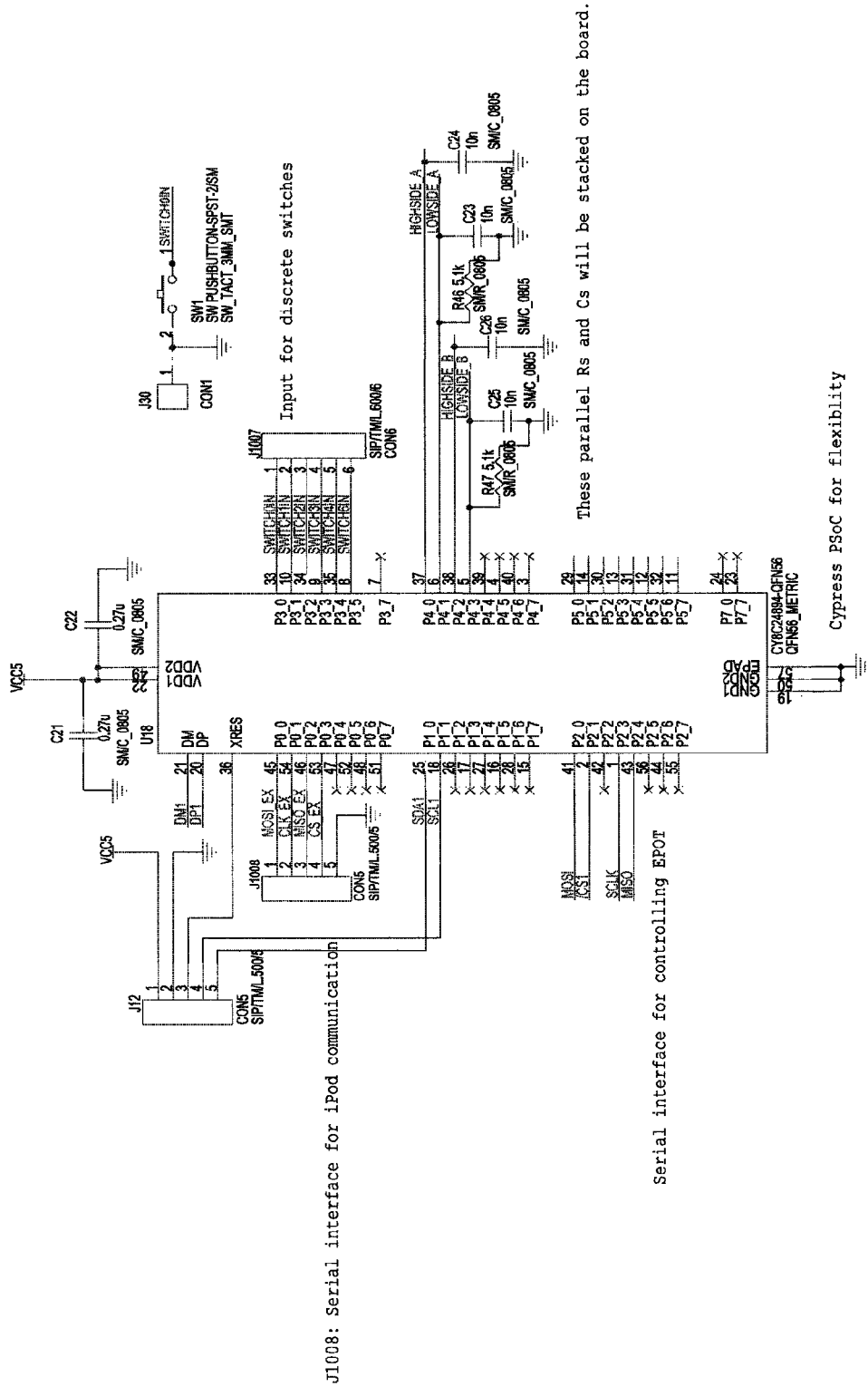
FIG. 4e illustrates an electronic circuit in accordance with one or more embodiments.

FIG. 4*c* along with FIG. 4*e* illustrate a USB device that can allow real-time changes of haptic profiles and can act as an HID compliant keyboard. This circuit is an example implementation of one way to provide the system user with a means to interact with the haptic device. A USB device is provided which defines two interfaces. One is a standard HID keyboard, the other is a generic HID device functioning as a haptic customization engine. The standard keyboard interface allows the key presses on the haptic device to register on the host as keypresses of a keyboard. In a similar fashion, the device could register the inputs as mouse commands, touch screen or touch pad input, or switch closures. The haptic customization engine interface allows host software to send a variety of commands to define, redefine, modify, select or read haptic profile information that is stored/used in the haptic device.

Figure 4F:
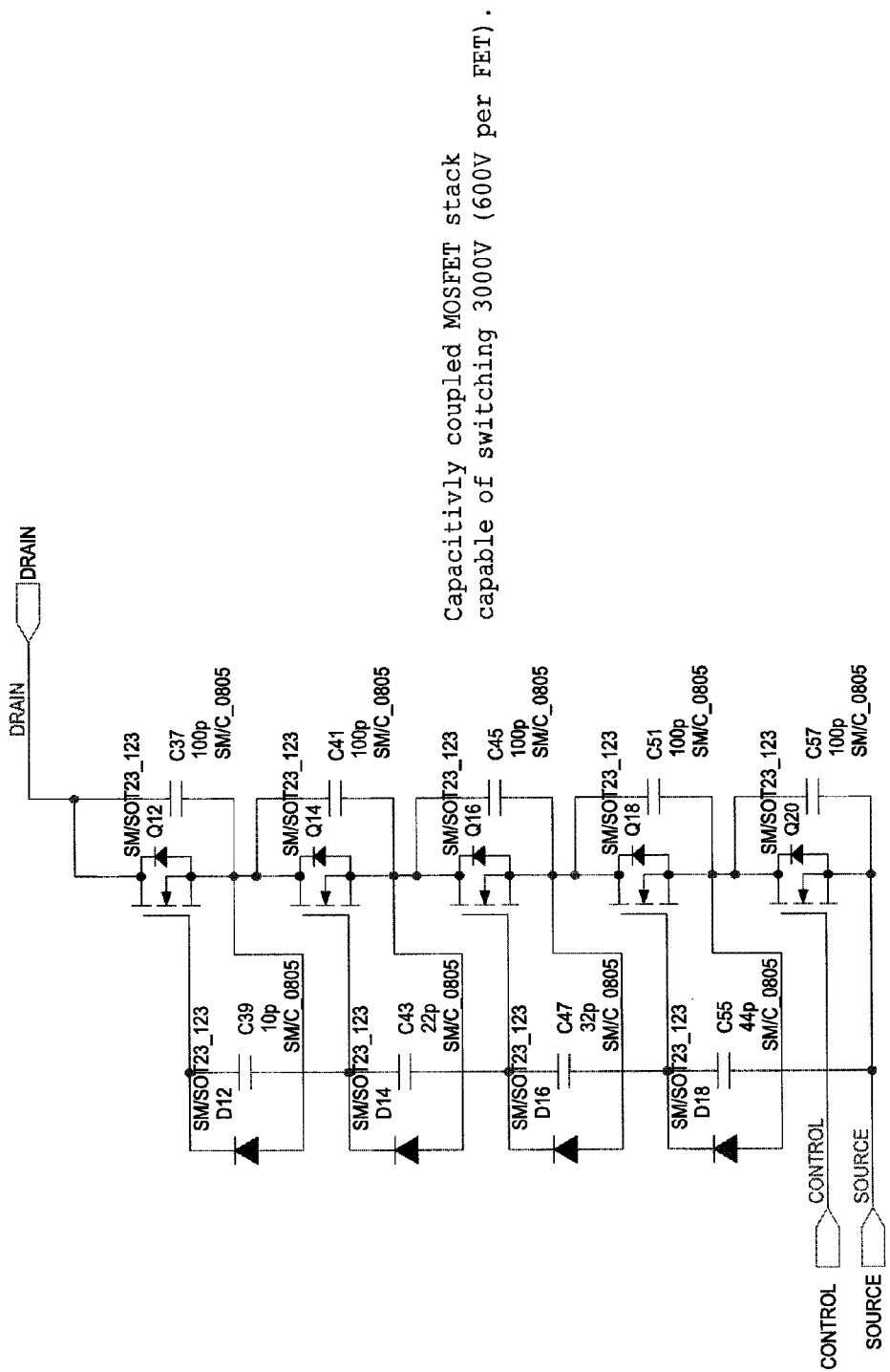
FIG. 4f illustrates an electronic circuit in accordance with one or more embodiments.

FIG. 4*d* illustrates an example schematic, combined with FIG. 4*f*, of the high-side and low-side switches used to drive the actuator. The components, including the optoisolators, constitute but one implementation. Accordingly, other implementations can be utilized without departing from the spirit and scope of the claimed subject matter.

FIG. 4*e* illustrates an example schematic of a microcontroller and supporting hardware used to implement the haptic customization engine, the haptic engine, the USB interface, the key scan circuitry, and the EEPROM. Other circuitry can be used without departing from the spirit and scope of the claimed subject matter.

FIG. 4*f* illustrates the details of FIG. 4*d*. This schematic is an example implementation of a solid state switch stacking scheme that allows inexpensive, low voltage parts to be used together in order to switch high voltage. This particular stacking scheme utilizes capacitor coupled MOSFET gates and is uniquely designed for this switching application to be very power efficient during idle and active state due to the elimination of resistors while providing reliable switching function to capacitive loads which include many electrically-deformable devices such as, by way of example and not limitation, electroactive polymers, piezo materials, and electrostatic actuators. It is to be appreciated and understood that capacitive coupling is not the only way to stack switches for increased voltage handling, nor are stacked switches the only way to handle switching of high voltage.

Embodiment with User Input Mechanism

In other embodiments, a device includes an actuator mechanism that is configured to provide tactile feedback to a user. In at least some embodiments, the actuator mechanism comprises a pair of spaced-apart substrates each of which supports a conductive layer of material. At least one of the substrates supports or otherwise is in operative contact with a user input mechanism by which a user can provide input to the device. In at least some embodiments, a dielectric material and an adjacent air gap are interposed between the substrates. In some instances, the dielectric material can comprise air itself. The device also includes drive circuitry operably connected to the spaced-apart substrates. The drive circuitry is configured to drive the conductive layers of material with an electrical signal responsive to the device receiving input via the user input mechanism. Driving the conductive layers causes movement of one or both of the substrates. In some embodiments, the drive circuitry can use different drive profiles to drive the conductive layers to provide various tactile feedback to the user through the user input mechanism.

Figure 5A:
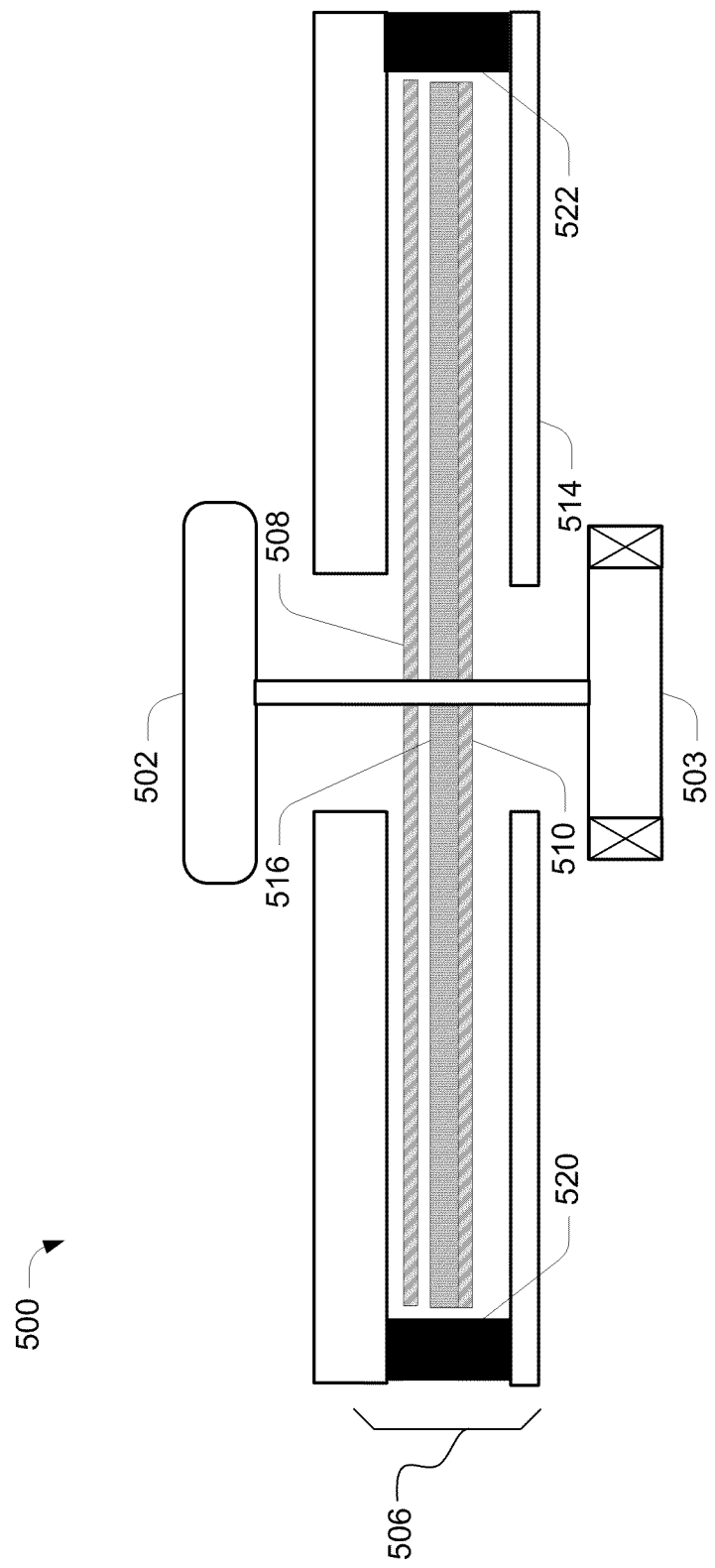
FIG. 5a illustrates a side sectional view of an example material assembly in accordance with one or more embodiments.

As an example, consider FIG. 5*a* which illustrates a side sectional view of an example material assembly in accordance with one or more embodiments generally at 500. In this example, material assembly 500 includes a user input mechanism in the form of a knob 502. The knob can comprise any suitable type of knob which is engageable by a user. Additionally, any suitable type of user input mechanism can be used. In at least some embodiments, the user input mechanisms can be either virtual or non-virtual. For example, a virtual user input mechanism can include, by way of example and not limitation, sliders, buttons, and the like. The knob 502 is connected via a shaft to a bearing 503.

Material assembly 500 also includes an actuator mechanism 506 operably associated with the knob 502. The actuator mechanism is configured to provide tactile feedback to a user responsive to a user touching or otherwise engaging the knob 502. In at least some embodiments, the actuator mechanism 506 comprises a pair of spaced-apart substrates 508, 510 each of which is conductive or supports a conductive layer of material. In at least some embodiments, a dielectric material 516 and an adjacent air gap are interposed between the substrates 508, 510. In addition, actuator mechanism 506 also includes a spring mechanism to 520, 522. Any suitable type of spring mechanism can be utilized such as various types of mechanical springs, rubberized springs, rubberized stoppers, elastomeric material, resilient gasket material, and the like.

Examples of suitable types of springs and spring mechanisms are described in U.S. Provisional Application No. 61/143,203 incorporated by reference above.

Any suitable type of materials can be utilized to provide components of the material assembly 500.

For example, in at least some embodiments, substrates 508, 510 can be formed from a clear material such as plastic or glass. Additionally, the conductive layers of material can comprise any suitable type of conductive material. In at least some embodiments, the conductive material is a clear conductive material. Alternately or additionally, in at least some embodiments, the conductive material is a spray-on material or film that is coated onto the surfaces of substrates 508, 510 as described above. Alternately or additionally, in at least some embodiments, the conductive material can comprise indium tin oxide, silver, copper, or any other suitable type of conductive material.

Dielectric material 516 can comprise any suitable type of dielectric material such as, by way of example and not limitation, air, glass, plastic, elastomeric material, gels and/or other fluidic or non-fluidic materials.

In one or more embodiments, various parameters associated with the material assembly 500 can be selected in order to provide desired operating characteristics. For example, parameters associated with the dimension of air gap, the thickness of dielectric material 516, and the dielectric constant of dielectric material 516 can be selected in order to provide desired operating characteristics. Example parameters have been given above.

The material assembly 500 can have other components associated with it, such as those components illustrated and described in connection with FIG. 3. As such, the drive circuitry that can be utilized in connection with material assembly 500 can provide tactile feedback to a user when the user, for example, turns the knob. For example, a particular signal or voltage profile can be selected and applied, as described above, to provide tactile feedback in the form of repeated clicks when the knob is turned by the user. It is to be appreciated and understood, however, that other profiles can be used depending on the type of user input mechanism.

Figure 5B:
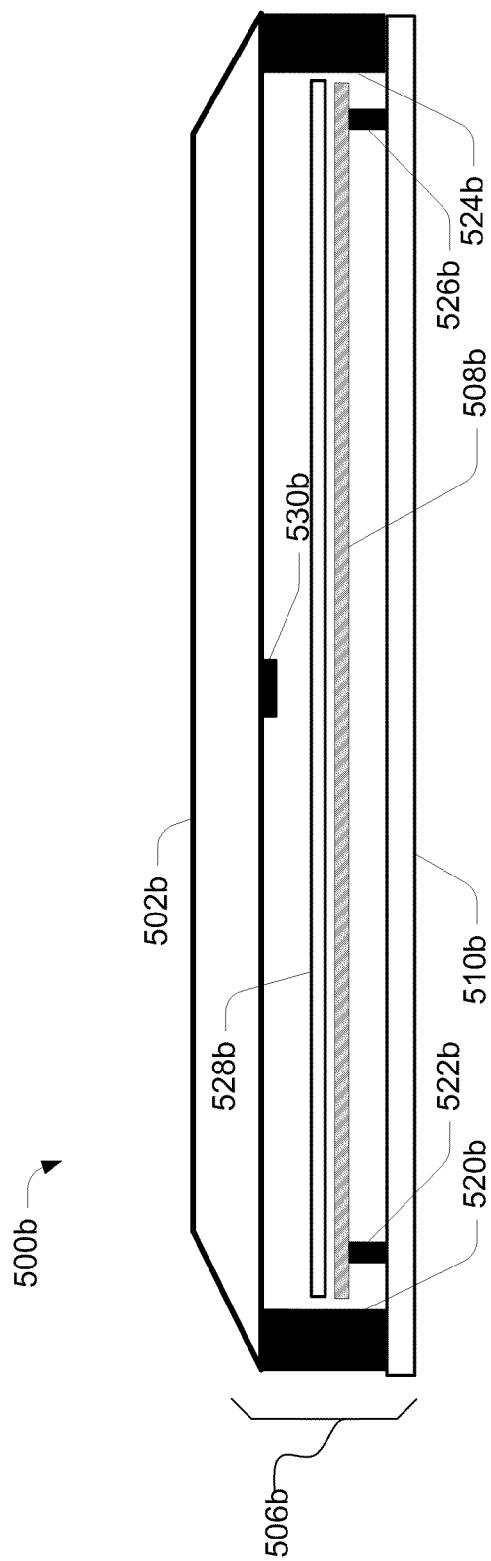
FIG. 5b illustrates a side sectional view of an example material assembly in accordance with one or more embodiments.

As another example, consider FIG. 5b which illustrates a side sectional view of an example material assembly in accordance with one or more embodiments generally at 500b. In this example, material assembly 500b includes a user input mechanism in the form of a key 502b such as one would find on a computer keyboard.

Material assembly 500b includes an actuator mechanism 506b operably connected to key 502b and comprising a pair of spaced apart substrates 508b, 510b each of which has conductive properties. In the present example, substrate 508b can comprise any suitable type of substrate examples of which are provided above. In this particular example, substrate 510b comprises a metal backer material such as sheet metal. Of course, any suitable type of material can be utilized. Actuator mechanism 506b also includes spring mechanisms 520b, 522b, 524b, and 526b. Spring mechanisms 520b and 524b are connected between substrate 510b and key 502b. Spring mechanisms 522b and 526b are connected between substrate 510b and substrate 508b.

Further, actuator mechanism 506b includes a membrane switch layer 528b and a detent 530b connected to the underside of key 502b. When key 502 is depressed, detent 530b comes into contact with membrane switch layer 528b closing a switch. When the switch is closed, drive electronics can apply an electronic signal to substrate 508b and/or substrate 510b thus causing substrate 508b to be attracted to substrate 510b. This can provide haptic feedback to a user. In at least some embodiments, 40 to 50 g of pressure can be utilized as a key spring force to press down the key to the membrane switch layer. Further, the membrane switch layer can achieve switch closure with about 10 to 20 g of pressure.

Having considered various embodiments, consider now an example method that can be implemented by the embodiments described herein.

Example Method

FIG. 6 is a flow diagram that describes steps in a method in accordance with one or more embodiments. The method can be implemented in connection with any suitable hardware, software, firmware, or combination thereof. In at least some embodiments, the method can be implemented in connection with systems such as those that are described above.

Step 600 senses user input. This step can be performed in any suitable way. For example, in at least some embodiments, a user's input can be sensed responsive to the user touching a touch surface such as a touch screen or touch pad. In yet other embodiments, a user's input can be sensed relative to a user input mechanism. Examples of user input mechanisms have been provided above. In addition, examples of various technologies that can be utilized to sense a user's input have been provided above.

As an example, consider FIG. 7 which illustrates the FIG. 2 embodiment. In this example, a finger 700 has touched touch screen 202.

Responsive to sensing the user's input, step 602 applies an electrical signal, such as a voltage or a voltage profile to conductive layers that are supported by substrates, such as those conductive layers and substrates that are described above. Any suitable type of electrical signal can be applied including those that are defined by voltage profiles such as the profiles that are described above. Applying voltage to the conductive layers provides tactile feedback to user as described above.

Figure 8:
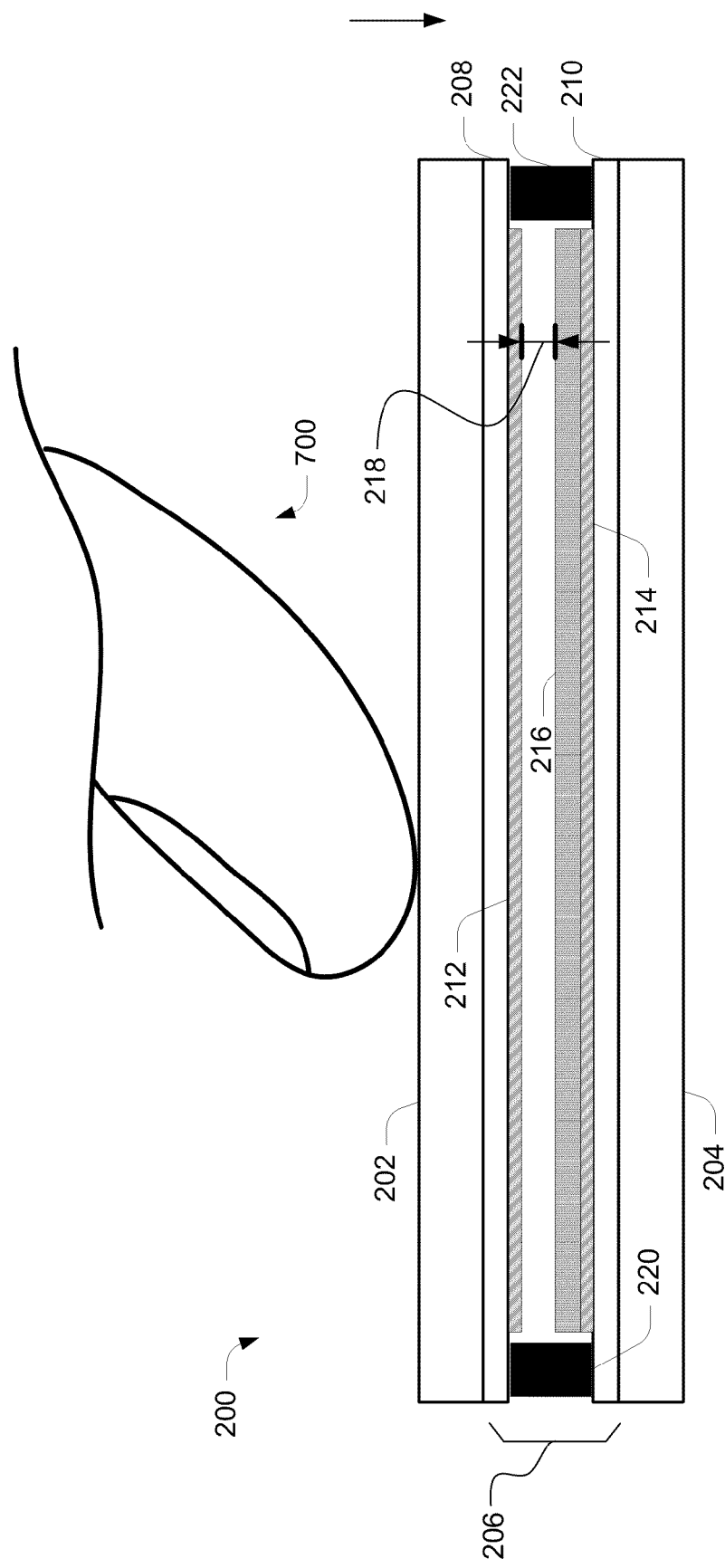
FIG. 8 illustrates a side sectional view of the FIG. 7 material assembly in accordance with one or more embodiments.

As an example, consider FIG. 8 which continues the FIG. 7 example. There, a voltage has been applied to the conductive layers of material 212, 214 thus causing an attractive force between the layers and hence, the substrates 208, 210 respectively, on which they reside. Responsive to the applied voltage, in this example, substrate 208 moves towards substrate 210 thus compressing spring mechanism 220, 222. As can be seen by a comparison of FIGS. 7 and 8, air gap 218 and hence, the distance between substrates 208 and 210 has been reduced.

When the voltage is removed from the conductive layers of material, the resiliency of spring mechanism 220, 222 causes substrates 208, 210 to return to what can be considered as an unbiased disposition relative to one another. The movement of the substrates as just described provides tactile feedback to the user which can simulate a button click or, depending on the voltage profile, any other suitable type of tactile feedback such as a buzz or vibration and the like.

It is to be appreciated and understood, however, that audio signals can be used to drive the conductive layers.

Varying Feedback Based Upon User Interface Element

In one or more embodiments, tactile feedback can be varied based upon the type of user interface element that is engaged by the user. For example, some types of user interface elements such as virtual buttons lend themselves to tactile feedback in the form of a click. This click can be provided by selecting and applying an appropriate electronic signal profile responsive to sensing the user input relative to the virtual button. Ultimately, other types of user interface elements such as sliders and the like lend themselves to tactile feedback of a different nature. For example, perhaps a device designer would like to have their slider elements provide tactile feedback in the form of multiple clicks in rapid succession as the slider is moved along its track. In this case, selection and application of the appropriate electronic signal profile can provide the desired tactile feedback.

As an example, consider FIG. 9 which is a flow diagram that describes steps in a method in accordance with one or more embodiments. The method can be implemented in connection with any suitable hardware, software, firmware, or combination thereof. In at least some embodiments, the method can be implemented utilizing a system such as the systems described above.

Step 900 senses user input. This step can be performed in any suitable way. For example, in at least some embodiments, a user's input can be sensed responsive to the user touching a touch surface such as a touch screen or touch pad. In yet other embodiments, a user's input can be sensed relative to a user input mechanism. Examples of user input mechanisms have been provided above. In addition, examples of various technologies that can be utilized to sense a user's input have been provided above.

Step 902 ascertains an input location associated with the user's input. As an example, consider FIG. 10. There, the device of FIG. 1 is shown generally at 1000. Like numerals from the FIG. 1 embodiment have been utilized to depict like components. In this example, three user interface elements are shown at 1002, 1004, and 1006. User interface elements 1002 and 1004 are icons that represent buttons, and user interface element 1006 is a slider. In this particular example, a user has selected user interface element 1004 and, responsively, the method ascertains the input location associated with the user's input.

Step 904 ascertains a user interface element associated with the input location. In this particular example, the method ascertains that user interface element 1004 corresponds to and is associated with the input location touched by or otherwise engaged by the user. Step 906 selects an electronic signal profile associated with the user interface element ascertained in step 904. Any suitable electronic signal profile can be used. In this particular example, an electronic signal profile associated with providing tactile feedback in the form of a click can be selected. In an event the user had selected user interface element 1006, a different electronic signal profile would have been selected, e.g., a signal profile associated with providing tactile feedback in the form of multiple clicks at a rapid frequency.

Having selected an appropriate electronic signal profile in step 906, step 908 applies the selected electronic signal profile to conductive layers associated with substrates supporting the conductive layers, such as those substrates described above. Doing so provides tactile feedback to the user in accordance with the selected voltage profile.

CONCLUSION

In one or more embodiments, two conductive surfaces are utilized and suitably driven to provide movement of at least one of the surfaces through attractive and/or repellant forces. The movement of the surfaces can be harnessed or utilized to provide a variety of functionality. Any suitable type of material can be used for the conductive surfaces. For example, the conductive surfaces can be formed as part of a transparent substrate. Alternately or additionally, the conductive surfaces can be formed from material that is not transparent, e.g., a metal material.

In one or more embodiments, a device includes a surface and an actuator mechanism operably associated with the surface. The actuator mechanism is configured to provide tactile feedback to a user in contact with the surface. In at least some embodiments, the actuator mechanism comprises a pair of spaced-apart substrates each of which supports a conductive layer of material. In at least some embodiments, a dielectric material and an adjacent air gap are interposed between the substrates. The device also includes drive circuitry operably connected to the spaced-apart substrates. The drive circuitry is configured to drive the conductive layers of material with an electrical signal. Driving the conductive layers with the electrical signal causes one or more of the corresponding substrates to be moved either or both of towards one another or away from one another. In some embodiments, the drive circuitry can use different drive profiles to drive the conductive layers to provide various tactile or audio feedback to the user.

In other embodiments, a device includes an actuator mechanism that is configured to provide tactile or audio feedback to a user. In at least some embodiments, the actuator mechanism comprises a pair of spaced-apart substrates each of which supports a conductive layer of material. At least one of the substrates supports, either directly or indirectly, or is otherwise in operative contact with a user input mechanism by which a user can provide input to the device. In at least some embodiments, a dielectric material and an adjacent air gap are interposed between the substrates. The device also includes drive circuitry operably connected to the spaced-apart substrates. The drive circuitry is configured to drive the conductive layers of material with an electrical signal. Driving the conductive layers with an electrical signal causes movement of one or both of the substrates. In some embodiments, the drive circuitry can use different drive profiles to drive the conductive layers to provide various tactile feedback to the user through the user input mechanism.

In at least some embodiments, the electrical signal that drives the conductive layers can be generated responsive to: user input or interaction, software events, and/or external triggers such as interaction with others, alerts, messages, reminders and the like. With respect to user interaction, such can occur through, for example, a touch screen, touch pad, keyboard, key pad, discrete switches (mechanical or digital), linear or rotary motion sensing, proximity, interactive content, invalid entry, limits and the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device comprising:
    a housing;
    a surface responsive to user engagement, the surface supported by the housing;
    an actuator mechanism operably associated with the surface, the actuator mechanism comprising a pair of conductive layers maintained in a spaced-apart configuration by a peripheral spring mechanism disposed between the pair of conductive layers defining an air space between the pair of conductive layers, one of the pair of conductive layers associated with the surface and operable to move relative to the other conductive layer; and
    drive circuitry configured to drive the conductive layers with an electrical signal that increases an attractive force between the conductive layers, the electrical signal applied in response to an engagement provided by the user at the surface, the attractive force causing movement of at least one of the conductive layers relative to the other of the conductive layers, the movement causing a compression of the peripheral spring mechanism reducing the air space between the pair of conductive layers thereby providing tactile feedback to the user.

2. The device of claim 1, further comprising a solid dielectric material interposed between the pair of spaced-apart conductive layers.

3. The device of claim 1, wherein the surface comprises a touch sensitive surface.

4. The device of claim 1, wherein the surface comprises a touch screen.

5. The device of claim 1, wherein the surface comprises a touch pad.

6. The device of claim 1, wherein the surface comprises a keyboard.

7. The device of claim 1, wherein the surface comprises a touch sensitive control panel.

8. The device of claim 1, further comprising a display operably adjacent one of the spaced-apart conductive layers.

9. The device of claim 1, wherein the device comprises a hand-held device.

10. The device of claim 1, wherein the device is configured for use in a vehicle.

11. The device of claim 1, wherein the peripheral spring mechanism is configured to decompress upon a change in the electrical signal that decreases the attraction between the pair of conductive layers, the decompression causing at least one of the conductive layers to move away from the other of the conductive layers and restore the air space between the pair of conductive layers.

12. The device of claim 1, wherein the conductive layers are disposed upon spaced-apart clear material substrates.

13. The device of claim 1, wherein each conductive layer comprises indium tin oxide.

14. The device of claim 2, wherein the dielectric material comprises glass or plastic.

15. The device of claim 1, wherein the drive circuitry is configured to utilize different drive profiles.

16. A material assembly comprising:
    a surface responsive to user engagement provided with a first conductive layer;
    a second conductive layer operably associated with the first conductive layer;
    a peripheral spring mechanism interposed between the first and second conductive layers defining an air space between the first and second conductive layers;
    wherein at least one of the first or second conductive layers is configured to be driven toward the other conductive layer when an electrical signal is applied to at least one of the first or second conductive layers to cause movement of the first conductive layer relative to the second conductive layer, the movement causing a compression of the peripheral spring mechanism reducing the air space between the first and second conductive layers thereby providing tactile feedback to a user.

17. The material assembly of claim 16, further comprising a solid dielectric material interposed between the first and second conductive layers.

18. The material assembly of claim 16, wherein the material assembly is configured to form part of a hand-held device.

19. The material assembly of claim 16, wherein the first and second conductive layers are disposed upon first and second substrates comprising a clear material.

20. The material assembly of claim 16, wherein the peripheral spring mechanism is configured to decompress upon a change in the electrical signal that decreases the attraction between the conductive layers, the decompression causing the first conductive layer to move away from the second conductive layer and restore the air space between the conductive layers.

21. The material assembly of claim 16, wherein at least one conductive layer is disposed on a substrate composed of a non-conductive material.

22. The material assembly of claim 21, wherein the at least one conductive layer comprises a clear conductive material.

23. The material assembly of claim 21, wherein the at least one conductive comprises indium tin oxide.

24. The material assembly of claim 17, wherein the dielectric material comprises glass or plastic.

25. The material assembly of claim 16 further comprising a housing supporting the material assembly.

26. The material assembly of claim 16 further comprising a housing supporting the material assembly, wherein the housing defines a hand-held device.

27. The material assembly of claim 16, wherein surface responsive to user engagement comprises a touch screen.

28. The material assembly of claim 16, wherein surface responsive to user engagement comprises a touchpad.

29. The material assembly of claim 16, wherein surface responsive to user engagement comprises a key on a keyboard.

30. The material assembly of claim 16, wherein surface responsive to user engagement comprises a touch sensitive control panel.

31. The material assembly of claim 16, wherein surface responsive to user engagement comprises a knob.

32. A method comprising:
    sensing a user input at a surface responsive to user engagement, the surface associated with a first conductive layer;
    responsive to sensing the user input, applying an electrical signal to increase an attractive force between the first conductive layer and a second conductive layer, the first and second conductive layers separated by a peripheral spring mechanism disposed between the pair of conductive layers defining an air space between the first and second conductive layers, the attractive force causing movement of at least one of the conductive layers relative to the other of the conductive layers, the movement causing a compression of the peripheral spring mechanism reducing the air space between the first and second conductive layers thereby providing tactile feedback to the user responsive to said sensing.

33. The method of claim 32 further comprising after said sensing and before said applying, ascertaining an input location associated with the user input.

34. The method of claim 32 further comprising:
    after said sensing and before said applying, ascertaining an input location associated with the user input; and
    ascertaining a user interface element associated with the input location.

35. The method of claim 32 further comprising:
    after said sensing and before said applying, ascertaining an input location associated with the user input;
    ascertaining a user interface element associated with the input location; and
    responsive to ascertaining the user interface element, selecting an electrical signal profile associated with the user interface element, wherein applying the electrical signal comprises applying the electrical signal profile.

36. The method of claim 32, wherein the device comprises a hand-held device.

\* \* \* \* \*